US012472259B2

(12) United States Patent
Enzensperger et al.

(10) Patent No.: US 12,472,259 B2
(45) Date of Patent: Nov. 18, 2025

(54) PKC INHIBITORS FOR THE TREATMENT OF SEPTIC CHOLESTASIS WITH POLYMETHINE DYE TARGETING

(71) Applicant: SMARTDYELIVERY GMBH, Jena (DE)

(72) Inventors: Christoph Enzensperger, Jena (DE); Marc Lehmann, Jena (DE)

(73) Assignee: SMARTDYELIVERY GMBH, Jena (DE)

( * ) Notice: Subject to any disclaimer, the term of this patent is extended or adjusted under 35 U.S.C. 154(b) by 1293 days.

(21) Appl. No.: 17/271,411

(22) PCT Filed: Aug. 26, 2019

(86) PCT No.: PCT/EP2019/072720
§ 371 (c)(1),
(2) Date: Feb. 25, 2021

(87) PCT Pub. No.: WO2020/043667
PCT Pub. Date: Mar. 5, 2020

(65) Prior Publication Data
US 2021/0315996 A1 Oct. 14, 2021

(30) Foreign Application Priority Data
Aug. 27, 2018 (EP) .................................. 18191028

(51) Int. Cl.
*A61K 47/22* (2006.01)
*A61K 31/553* (2006.01)
(Continued)

(52) U.S. Cl.
CPC ............ *A61K 47/22* (2013.01); *A61K 31/553* (2013.01); *A61K 45/06* (2013.01); *A61K 47/545* (2017.08);
(Continued)

(58) Field of Classification Search
CPC .. A61K 47/22; A61K 47/6937; A61K 47/545; A61K 31/553; A61K 45/06; C12N 15/1137; C12N 2310/351; C12N 2320/32
See application file for complete search history.

(56) References Cited

U.S. PATENT DOCUMENTS 9,795,688 B2   10/2017  Bauer
2016/0220697 A1 *  8/2016 Bauer .................... A61P 43/00

FOREIGN PATENT DOCUMENTS

EP        2848262 A1 *  3/2015  .......... A61K 31/713
JP        2016531142 A     10/2016

OTHER PUBLICATIONS

Buescher GLB: "Der Einfluss Von Proteinkinase-C-Isoformen Auf Die Lokalisation Und Funktion Des ABCC2/MRP2-TRANSPORT-ERS in Einem Modell Der Septischen Cholestase" Nov. 9, 2017 (Nov. 9, 2017). pp. 1-138.

(Continued)

*Primary Examiner* — Blessing M Fubara
(74) *Attorney, Agent, or Firm* — Abel Schillinger, LLP

(57) ABSTRACT

The invention relates to inhibitors of the PKC signaling pathway for use in the treatment of septic cholestasis, wherein the inhibitors are targeted into the liver by a selective nanostructured delivery system, wherein the selective nanostructured delivery system comprises at least one polymethine dye and at least one polymer and/or at least one lipid and/or at least one virus-like particle, wherein the at least one polymethine dye is a symmetrical or asymmetrical polymethine.

23 Claims, 17 Drawing Sheets

(51) Int. Cl.
    *A61K 45/06*     (2006.01)
    *A61K 47/54*     (2017.01)
    *A61K 47/69*     (2017.01)
    *C12N 15/113*    (2010.01)

(52) U.S. Cl.
    CPC ...... *A61K 47/6937* (2017.08); *C12N 15/1137* (2013.01); *C12N 2310/14* (2013.01); *C12N 2310/351* (2013.01); *C12N 2320/32* (2013.01)

(56)             References Cited

OTHER PUBLICATIONS

Martinac P et al: "Protein kinase C as target to resolute excretory liver failure in sepsis .8th International Congress Sepsis and Multiorgan Dysfunction" vol. 45. Sep. 1, 2017 (Sep. 1, 2017), 1 pg.

Press AT et al: "Cell type-specific delivery of short interfering RNAs by dye-functionalised theranostic nanoparticles" Nature Communications. vol 5. No. 1, Dec. 1, 2014 (Dec. 1, 2014), 13 pgs.

Recknagel P et al: Liver Dysfunction and Phosphatidylinositol-3-Kinase Signalling in Early Sepsis: Experimental Studies in Rodent Models of Peritonitis .PLOS Medicine. vol. 9. No. 11, Nov. 13, 2012 (Nov. 13, 2012), 17 pgs.

Martin EL et al: Phosphoinositide-3 Kinase [gamma] Activity Contributes to Sepsis and Organ Damage by Altering Neutrophil Recruitment. American Journal of Respiratory and Critical Care Medicine. vol. 182. No. 6., Sep. 15, 2010 (Sep. 15, 2010). 12 pgs.

* cited by examiner

PKC-activity reducing agent
Representative PKC inhibitors

Staurosporin

BIM-1

Chelerythrine

Ruboxistaurin

Representative PI3K Inhibitors

AS605240

Wortmannin

Copanlisib

Artificial nucleic acid constructs

Polyplex

Targeted nanostruct. delivery system

Nanostructured carrier system

PTM (stars): Surface exposed

Shell: Polymer, Liposome, protein, virus, virus-like particle

Nucleic acid constructs

Nucleic acid construct

+

Positively charged polymer with PTM

Polyplex with PTM

PTM bound to PKC red. agents (A) Small molecule (B)

Figure 11: PCI model with different doses and stool batches; left: 2.5µg/g batch 1; right: 6µg/g batch 2

PKC INHIBITORS FOR THE TREATMENT OF SEPTIC CHOLESTASIS WITH POLYMETHINE DYE TARGETING

Cholestasis refers to an impaired bile formation and flow, and subsequent bilirubin and bile acid retention. Two forms of cholestasis are known: extrahepatic cholestasis, which is an obstructive type of cholestasis caused by a mechanical blockage in the duct system and displacement of the biliary tract which can occur, for example, from a gallstone, tumors, such as pancreatic carcinoma, bile duct cysts, bile duct stenosis or parasites, and intrahepatic cholestasis (non-obstructive cholestasis), where the reason for the congestion of bile is inside the liver. Intrahepatic cholestasis can occur because of genetic defects or can be acquired as a side effect of many medications, for example, non-steroidal anti-inflammatory drugs (NSAIDs), antihypertensive-, antidiabetic-, anticonvulsant-, lipid-lowering agents, anabolic steroids, psychotropic drugs, and various antibiotics. Moreover, cholestasis can also occur as a result of viral or alcoholic hepatitis, hepatocellular carcinoma, granulomatous liver disease, or liver cirrhosis. However, the second most prevalent cause is extrahepatic infection (sepsis). It can also occur during parenteral nutrition, pregnancy, after liver transplantation. As a consequence of the reduced bilirubin excretion, patients with cholestasis show symptoms of jaundice. Depending on the cause, cholestasis may be associated with itchiness (pruritus), gastrointestinal complaints, such as pale stool, dark urine, nausea, vomiting, and pain. Cholestatic liver disease is diagnosed by a predominant elevation of serum alkaline phosphatase and bilirubin, although serum bilirubin may be normal until a late stage of the disease. Manifest intrahepatic cholestasis is a rare, but typical symptom of sepsis. In Germany, for example, about 30,000 people develop a sepsis-associated organ-failure and 3-6% of them develop a condition called septic cholestasis or sepsis-induced cholestasis, which is characterized by additional symptoms of jaundice. The mortality is 92% during the first 12 months after diagnosis, and is much higher than for any other sepsis-associated organ failure. (Jaeger et al. Jaundice Increases the Rate if Complications and One-Year Mortality in Patients with Hypoxic Hepatitis, Hepatology 2012, 56(6), 2297).

Sepsis

Sepsis should be defined as life threatening organ dysfunction caused by a dysregulated host response to infections with pathogens and is a major public health concern, accounting for more than $20 billion of total US hospital costs in 2011. It can be assumed that sepsis is a leading cause of mortality and critical illness worldwide. Furthermore, patients who survive sepsis often have long term physical, psychological and cognitive disabilities with significant health care and social implications. Sepsis can have various origins and can arise from bacterial, viral, fungal or protozoal infections. Sepsis is not only defined by a systemic inflammation, more important is a dysregulated response of the patient to this infection, which leads to organ dysfunction and underlines the overall severity of this condition. Sepsis also involves pro- and anti-inflammatory responses, modifications in cardiovascular, neural, autonomic, hormonal, bioenergetics, metabolic processes and coagulation. Finally, the organ dysfunction or failure is responsible for the high sepsis associated mortality rate. Therefore, the so called "Sequential Organ Failure Assessment" (SOFA) scoring rate was developed to determine the severity of sepsis. They can be defined by clinical parameters as $Pa_{O2}/Fi_{O2}$, number of platelets, Bilirubin, Creatinine, urine output and mental status of the patient. It could be shown that an early antibiotic eradication of the underlying infection is most important for the survival of the patients. Additional therapeutic considerations include: avoiding parenteral nutrition, avoiding of hepatotoxic medications, monitoring of the glucose levels and adequate supply if necessary, extracorporeal liver support (i.e. albumin dialysis). Immunocompromised patients e.g. after organ transplantation, cancer therapy or therapy of autoimmune diseases have increased risk of infection by common pathogens, as well as opportunistic infections by less virulent microorganisms of little concern to patients with a non-compromised immune system. So it is obvious that this highly developing risk of infection predisposes such individuals to increased risk of sepsis and septic shock.

In sepsis, the dysregulated host response to the systemic infection often leads to hepatocellular dysfunction of membranous transport processes with consecutive disorders of biliary excretion (Zollner G., Trauner M.; Mechanism of cholestasis, Clin Liver Dis 2008; 12: 1-26). As a consequence, in septic patients, jaundice can be observed as a consequence of an intrahepatic (non-obstructive) cholestasis. A challenge is to timely discriminate between sepsis-associated and other sepsis-unrelated causes of cholestasis, (vide supra). Usually, prior to the development of septic cholestasis, the manifestations of sepsis dominate the clinical picture. It is likely that uncontrolled infection leads to decreased function and expression of important hepatocyte transport proteins, leading to reduction of bilirubin excretion and jaundice (Zollner G., Trauner M., I.c.). Septic cholestasis is associated with liver failure and has a mortality rate of over 92%.

Sepsis-Induced Cholestasis

Sepsis-induced cholestasis is a special kind of excretory dysfunctions of the liver. Excretory dysfunctions of the liver can have various causes: From carcinoma, cysts in the gall duct, inflammation of the liver (e.g. hepatitis), fibrosis or cirrhosis, fatty liver (alcoholic or non-alcoholic), side effects of certain drugs (e.g. anabolic drugs, antipsychotic drugs and certain antibiotics). In the case of septic cholestasis, an underlying systemic infection causes a disturbance of the whole immune system and triggers a secretory dysfunction if the liver. Therefore, sepsis-induced cholestasis represents the complication of a systemic infection. At present, the only effective treatment of septic cholestasis is a treatment of the underlying sepsis by an antibiotic therapy of the infection which should be initiated as soon as possible. The window of opportunity for successful intervention is short and a delay in diagnosing infection and initializing antibiotic therapy significantly worsens the prognosis and survival chances of the patient (Fuchs M., Sanyal A J.; *Sepsis and cholestasis*, Clin Liver Dis 2008; 12: 151-72). In order to promptly and efficiently eradicate a bacterial infection, usually a maximum tolerable dose of a combination of different broad-spectrum antibiotics is used in therapy, because a diagnosis of the responsible pathogen (blood culture) is in most cases not possible within a timeframe that could be tolerated.

Antibiotic therapy of the systemic infection is also associated with known problems and certainly is no therapy of an organ failure, which results from the dysregulated response to the infection. Moreover, several antibiotics can disturb and block bile excretion and therefore induce cholestasis (vide supra). Most prominent examples include amoxicillin and erythromycin. The high dose broad spectrum antibiotic therapy causes an emerging incidence of pathogens with antibiotic resistance and hampers the success of future therapy. Additionally, it has to be considered that antibiotic therapy is pointless, or even counterproductive if the underlying infection is fungal, viral or protozoal, due to the potential unwanted (toxic) side effects of some antibiotics, such as allergy, interactions with food and other medicaments, and/or direct damages to major organs, mainly kidneys and liver, especially if the organ functions are compromised.

In addition to antibiotic therapy of sepsis, further treatment approaches of sepsis with kinase inhibitors were described. USH1168H, filed in 1991, describes a therapy for septic shock which reduces inflammation and improves tissue and organ perfusion comprising infusing a PKC inhibitor selected from the group consisting of lipid analogs. This means a systemic administration of PKC inhibitors. U.S. Pat. No. 5,616,577, filed in 1996 (corresponding WO93/16703), describes the treatment and prevention of conditions wherein PKC inhibition is indicated. Those conditions are listed as cardiovascular and renal disorders, inflammation, central nervous system disorders, immunosuppression, and septic shock. US 2011/0130415 describes the treatment of a variety of inflammatory diseases including septic shock, by PKC inhibition.

While the effect of kinase inhibitors, especially PKC inhibition, on cholestasis is described (Anwer M. S.; *Role of protein kinase C isoforms in bile formation and cholestasis*, Hepatology 2014; 60(3): 1090-1097), treatment of sepsis by the use of kinase inhibitors is counterproductive and may cause life-threatening side effects for the reasons outlined in the paragraph "Kinase inhibitors and sepsis" (vide infra). At first, the role of kinase inhibitors on cholestasis is explained in further detail.

Kinase Inhibitors and Cholestasis

For intrahepatic cholestasis, the formation of the bile itself from the hepatocytes is impaired. Bile formation is a complex process where many different transhepatic solute transporters are involved, most prominent at the basolateral site, the Na-taurocholate co-transporting polypeptide (NTCP), and the bile salt exporter (BSEP) and the multidrug resistance-associated proteins (MRPs) at the apical hepatocyte membrane (Anwer M. S., l.c). The plasma membrane localization of these transporters is a very dynamic process, which is regulated by posttranslational events, especially by kinases like protein kinase C (PKC), phosphoinositide 3-kinase (PI3K), AMP-activated protein kinase (AMPK) and mitogen-activated protein kinase (MAPK). It could be shown in various experiments that PKC inhibitors or PI3 Kinase inhibitors are useful preclinical tools for the treatment of cholestasis. (Anwer M. S., l.c.; Toledo et al. Arch Toxicol. 2017, 91:2391-2403; and Li et al Pharm. Res. 2017, 125, 105-113). These kinase inhibitors highly influence cell proliferation and the signaling of immune cells and act as immune suppressive agents.

Kinase Inhibitors and Sepsis

As outlined above, sepsis is a serious, complex systemic immune reaction, triggered by an infection. The body relies on its immune system to counteract this infection. It is known in the art that kinase inhibitors, such as PKC and PI3 kinase inhibitors, are able to suppress an immune response in case of an inflammation. Therefore, it is suggested that an exaggerated inflammatory response can be treated with such compounds, also in case of sepsis (see, e.g., USH1168H, U.S. Pat. No. 5,558,969, WO93/16703, cited above). It has, however, to be realized on the one hand that certainly not the underlying infection itself is treated by such proposed treatments and on the other hand that for conditions associated with an infection, it is certainly not advisable to suppress the body's immune system. As already mentioned, immunocompromised patients have increased risk of infection by common pathogens and it is obvious that this highly developing risk of infection predisposes the patients to increased risk of sepsis and septic shock. Kinase inhibitors, such as PKC and PI3 kinase inhibitors, are also known to cause a higher incidence for various (additional) infections due to their immune suppressive properties. For these reasons, manufacturers of commercially available kinase inhibitors for the use in the treatment of different pathogen conditions, in particular kinds of cancer, indicate the immunosuppressive effect and explicitly warn against systemically administration of these inhibitors in presence of an infection or inflammation in the patient. See for example:

EMEA report EMEA/H/C/753 of May 24, 2007, (Doc. Ref. EMEA/150964/2007), page 13, concerning PKC inhibitor ruboxistaurin (drug name Arxxant; indicated for diabetic retinopathy);

On the Medscape site for healthcare professionals it is described for the PI3K inhibitor copanlisib (drug name Aliqopa; indicated for relapsed follicular lymphoma), that a withhold of the treatment in case of infection is necessary; The increased risk for infections (even sepsis itself) is described in detail by Kim et al. BJC, 2018, 118, 462-470.

Medscape (l.c.) also prescribes a withhold of the treatment with PI3K inhibitor idelalisib (drug name Zydelig; indicated for 3 classes of lymphoma) in case of infection especially mentions sepsis; regulation: "interrupt idealisib with until infection has resolved". This is also described in Zelenetz et al. Lancet Oncol. 2017, 18:297-311. They describe a five-fold higher risk of developing sepsis as adverse effect during idelalisib compared to placebo.

Novartis Pharma GmbH (2017): Rydapt® 25 mg Weichkapseln, Fachinformation (professional information) status September 2017, provides the highlights of prescribing information on PKC inhibitor midostaurin (drug name RYDAPT; indicated for AML (acute myeloid leukemia). Pages 1, right column, and page 5, Table 2, indicate the adverse reactions of midostaurin; On page 6, last paragraph, it is stated "Grade≥3 adverse reactions reported in ≥5% were fatigue, sepsis, gastrointestinal hemorrhage, pneumonia, diarrhea, febrile neutropenia, . . . . (Table 4). On page 7 it is explicitly stated: "Treatment discontinuation due to adverse reaction occurred in 21% of patients. The most frequent adverse reactions causing treatment discontinuation included infection . . . . Serious adverse reactions were reported in 68% of patients, most commonly (20%) due to infections and gastointestinal disorders." and "On-treatment death unrelated to the underlying malignancy occurred in 16 patients (11%), most commonly from infection (sepsis or pneumonia), followed by cardiac events. Of the on-treatment deaths from disease progression, 4 were attributed to infection." On page 8 adverse reaction occurring in A % of patients suffering from sepsis is outlined.

From the afore-mentioned it is evident that kinase inhibitors are not to be administered systemically when sepsis is present. This is a teaching away, and, consequently, a skilled person would not contemplate to administer kinase inhibitors to treat cholestasis during a systemic infection, like sepsis.

In summary: As outlined above, the currently known treatments of septic cholestasis (also: sepsis-induced or sepsis-associated cholestasis) are treatments of the underlying systemic infection. For conditions with an underlying systemic infection it is not advisable to suppress inflammatory responses with systemically administered immune-suppressive kinase inhibitors, because the immune modulatory adverse effects could result in life-threatening conditions, especially when such drugs are administered systemically.

It is therefore an object of the invention to provide an effective treatment of septic cholestasis by avoiding, at least minimizing, adverse side effects. It is further an object of the invention to provide a direct treatment of septic cholestasis itself.

This object has been solved by the present invention and by treating septic cholestasis with compounds that lower the activity or inhibit protein kinase C (PKC), which finally regulate the transporters, responsible for bile formation. These compounds are targeted into the liver by a unique and selective delivery system.

The invention relates in its first aspect to inhibitors of the PKC signaling pathway for use in the treatment of septic cholestasis, wherein the inhibitors are targeted into the liver by a selective nanostructured delivery system, wherein the selective nanostructured delivery system comprises at least one polymethine dye and at least one polymer and/or at least one lipid and/or at least one virus-like particle, wherein the at least one polymethine dye is a symmetrical or asymmetrical polymethine of the general structure I or II:

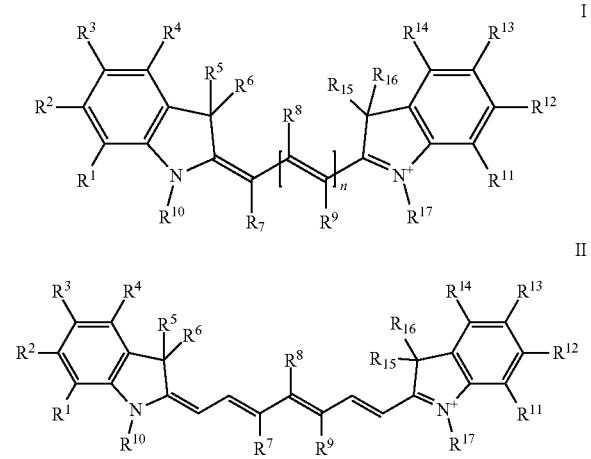

where
a. n stands for the numerical values 0, 1, 2, 3, 4, 5, 6, 7, 8, 9 or 10,
b. R1-R17 may be the same or different and maybe hydrogen or deuterium, one or more alkyl, tert-alkyl, cycloalkyl-(the "alkyl" and "cycloalkyl" radicals also include olefinic structures) or aryl, carboxyaryl, dicarboxyaryl, heteroaryl or heterocycloaliphatic radicals, alkyloxy, alkylmercapto, arlyoxy, arylmercapto, heteroaryloxy, heteroarylmercapto groups, a hydroxyl, halogen, nitro or cyano group, an alkyl-substituted or cyclic amine function and/or two ortho-position radicals, e.g., R3 and R4, R13 and R14 and/or R1 and R2 and R11 and R12 and/or R7 and R9, together may form an additional aromatic, heteroaromatic, aliphatic or heteroaliphatic ring,
c. at least one of the R1-R17 substituents has a solubilizing and/or ionizable or ionized substituent such as $SO_3^-$, ($-SO_3H$), $PO_3^{2-}$, COOH, OH or $NR_3^+$, cyclodextrins or sugar, which determines the hydrophilic properties of these polymethine dyes, wherein this substituent may also be bound to the polymethine dye by a spacer group, and
d. at least one of the R1-R17 substituents has a reactive group (linker) such as isocyanates, isothiocyanates, hydrazines, amines, mono- and dichloro- or mono- and dibromotriazines, aziridines, epoxides, sulfonyl halides, acid halides, carboxylic anhydrides, N-hydroxy-succinimide esters, imido esters, carboxylic acids, glyoxal, aldehyde, maleimide or iodacetamide and phosphoramidite derivatives or azides, alkynes or olefins, wherein this substituent may also be bound to the polymethine dye by a spacer group.
e. the aromatic, heteroaromatic, aliphatic or heteroaliphatic spacer group consists of structural elements such as $[(CH_2)_a-Y-(CH_2)_b]_c$ or $[(C_6H_4)_a-Y-(C_6H_4)_b]$, where Y may be the same or different and comprises $CR_2-$, $O-$, $S-$, $-SO_2$, $SO_2NH-$, $NR-$, $COO-$ or CONR functions, wherein it is bound to one of the R1-R17 substituents, and a.) and b.) may be the same or different and have numerical values of 0-18 and numerical values for c of 0-18,
f. the R8 and R9 substituents with corresponding n=2, 3, 4 or 5, may also be present 2 times, 3 times, 4 times or 5 times, and these may be the same or different.

In a preferred embodiment of the invention, the at least one polymethine dye is an ICG derivative.

Accordingly, a preferred embodiment of the invention therefore relates to inhibitors of the PKC signaling pathway for use in the treatment of septic cholestasis, wherein the inhibitors are targeted into the liver by a selective nanostructured delivery system, wherein the selective nanostructured delivery system comprises at least one ICG derivative and at least one polymer and/or at least one lipid and/or at least one virus-like particle, wherein the at least one ICG derivative or ICG-like polymethine dye is a symmetrical or asymmetrical polymethine of the general structure I or II as disclosed herein (depicted and further defined above and in the claims).

The term "ICG-derivative" means any polymethine dye with two indole moieties according to structures I and II, wherein the at least one residue can be used for coupling reactions and the net charge after coupling is −1 or +/−0.

Accordingly, ICG derivatives, ICG-like polymethine dyes, ICG-based polymethine dyes according to the invention relate to symmetrical or asymmetrical polymethine dyes falling under the general structure I or II as disclosed herein.

The terms "ICG derivatives", "ICG-like polymethine dyes" and "ICG-based polymethine dyes" are used synonymously with the same meaning.

According to the invention, the inhibitors are preferably delivered into the parenchymal cells of the liver by the inventive selective nanostructured delivery system.

Bile formation is a complex process where many different transhepatic solute transporters are involved, most prominent the Na taurocholate co-transporting polypeptide (NTCP), the bile salt exporter (BSEP) and the multidrug resistance-associated proteins (MRPs) (Anwer, l.c.). These transporters are located on the basal sites of the hepatocytes.

The plasma membrane localization of these transporters is a very dynamic process, which is regulated by posttranslational events, especially by kinases like protein kinases, such as protein kinase C (PKC), phosphoinositide 3-kinase (PI3K), AMP-activated protein kinase (AMPK) and mitogen-activated protein kinase (MAPK). It has been shown in various experiments that PKC or PI3K inhibitors are useful preclinical tools for the treatment of cholestasis. (Anwer, l.c.; Toledo et al., l.c.; Li et al., l.c.). These kinase inhibitors highly influence cell proliferation and signaling of immune cells and act as immune suppressive agents.

According to signaling pathways, the activity of PKC is highly dependent on the concentration of the regulatory molecules like diacyl glycerol (DAG) or calcium ($Ca^{2+}$), e.g.:

DAG concentration is mediated by enzymes like phospholipase C (PLC), which in turn is highly regulated by activation of various $G\alpha_q$ coupled GPCRs, AKT- and MAP-kinases, growth factors and cannabinoid receptors.

PLC activity is mainly regulated by PI3 kinases, which phosphorylate $PIP_2$ into $PIP_3$.

Activated PLC cleaves PIP2 into IP3 and DAG. IP3 triggers Ca-release into the endoplasmatic reticulum (ER), which in turn activates PKC. The molecule DAG itself also contributes to the activation of the PKC.

Therefore, PI3 kinase inhibitors, PLC inhibitors, DAG level reducing agents or any agents finally contributing to a reduced PKC are useful tools to treat septic cholestasis.

From the biochemical point of view, PI3 kinases produce the signaling molecule diacyl-glycerol (DAG), which in turn activates other protein kinases (e.g. PKC). Therefore, PI3 kinase inhibitors basically reduce DAG level, and hence also inhibit downstream, PKC. For this reason, agents capable for reducing DAG levels otherwise, are also useful in the treatment of septic cholestasis.

Accordingly, the term "inhibitor(s) of the PKC signaling pathway" of the invention relate to any substance(s) which influence the transmission and/or transduction of PKC mediated signals within the organism and cells. Such inhibitors especially comprise inhibitors of kinases which are involved in the PKC signaling pathway.

The term "inhibitor(s) of the PKC signaling pathway" further means any substance(s) which influence, preferably reduce or inhibit, the activity and/or expression and/or protein folding of PKC either directly or indirectly via regulatory molecules upstream to the PKC pathway. In a preferred embodiment, the activity and/or expression and/or protein folding of PKC itself, PI3Kinase, DAG, PLC, AMPK, MAPK, AKT is reduced by the inventive "inhibitor(s) of the PKC signaling pathway". Inventive inhibitor(s) of the PKC signaling pathway can be understood as PKC activity reducing agents. According to the invention, the terms "inhibitors of the PKC signaling pathway", "PKC activity reducing agents" and "inhibitors of the PKC activity", "inhibitors of the PKC expression" and "inhibitors of the PKC folding" are used synonymously.

Such "inhibitor(s) of the PKC signaling pathway" can act either directly inhibit the abovementioned proteins/signaling molecules for example by:

direct inhibition of PKC by PKC inhibitors, such as midostaurin, staurosporine, BIM-1 and other drugs; or by silencing of the protein biosynthesis of PKC or the respective proteins/signaling molecules by siRNA, miRNA, shRNA, modified oligo analogues or antisense constructs; and also, by using other molecular biological methods known in the art, like CRISPR/Cas, TALEN, zincfinger nucleases or anti-sense oligo nucleotides.

Consequently, in a preferred embodiment, the inhibitors of the PKC signaling pathway for use in the treatment of septic cholestasis directly or indirectly inhibit or reduce the activity of PKC or any PKC subtype.

Direct inhibition or reduction of the activity of PKC according to the invention means influencing the activity by PKC inhibitors including nucleic acid constructs that silence the respective genes, preferably via RNAi. This can be accomplished by generally known methods, preferably by methods using constructs, such as siRNA, miRNA, shRNA, RNAse H, modified oligomers, like morpholinos. According to the known biochemical approaches, respective nucleic acid constructs are designed and either directly bound to the polymethine-based targeting moiety by covalent binding, or by encapsulation in nanocarriers bearing the polymethine-based targeting moiety.

The indirect inhibition or reduction of the activity of PKC according to the invention is preferably accomplished by inhibition or reduction of pathways and/or signaling molecules, necessary for PKC activity. PKC activity is driven by various factors: PI3 kinase inhibitors, PLC inhibitors, DAG level reducing agents or any agents finally contributing to a reduced PKC are useful tools to treat septic cholestasis. Therefore, all kinds of agents (e.g. PI3 kinase Inhibitors, PLC inhibitors), capable to influence the PKC signaling pathway by reducing PKC activity are inhibitors according to the invention and useful tools for the treatment of septic cholestasis. This can again be achieved either by small molecule inhibitors, such as PI3 kinase inhibitors described herein, and/or PLC inhibitors like U-73122, D609, manalide, edelfosin or respective nucleic acid constructs.

Direct and indirect inhibition or reduction of the PKC activity according to the invention has also to be understood and comprises any influence on the expression of PKC genes including PKC subtype genes, their transcription and/or translation and/or protein folding resulting in a decreased and/or no gene product and/or PKC protein. Such an influence has to be understood as decreasing (reduction) or preventing, turning off, switching off (inhibition) the PKC expression, and thus PKC activity.

Presently, PKC inhibitors are predominantly used in cancer therapy and in the treatment of autoimmune diseases. Currently two PKC inhibitors are available as proofed drugs, namely Rydapt® (midostaurin) and Arxxant® (ruboxistaurin).

Further known drugs relate to idelasilib and copanlisib. In the information site for professionals for both compounds (Medscape references: referred to/cited above) it is due to their immunosuppressive properties strictly contraindicated in case of serious infections including sepsis and it is advised to discontinue the therapy during that time.

Until now, no specific treatment of septic cholestasis in the clinics is available and treatment with any of the above-mentioned agents systemically administered would be too risky due to the fragile immune status during underlying sepsis and the therapeutic dose in the liver required to elicit any positive effects on septic cholestasis.

The present invention therefore provides for the first time a specific treatment of septic cholestasis itself by avoiding, at least reducing, dangerous, systemic immunosuppressive effects on the body of a patient. This is achieved according to the invention by a selective targeting of therapeutic agents to the side of action, i.e. the liver parenchymal cells. The inventive nanostructured delivery system provides an active hepatocyte targeting to treat septic cholestasis, which is accomplished by polymethine dye derived targeting moieties, which are selectively recognized by special lectins, present on liver tissue. According to the invention, the systemic circulation and also the required therapeutic dose of these therapeutically active agents can be highly reduced compared to systemic administration of PKC inhibitors in the treatment of pathological conditions.

According to the invention, the inhibitors are administered, e.g. by injection, and selectively delivered, by the inventive nanostructured delivery system, to their site of action, i.e. the liver, to treat septic cholestasis. In this way, the side effects (immunosuppression) associated with a systemic treatment of infections with kinase inhibitors described above without delivering the inhibitor to the desired side of action are reduced, preferably avoided. Additionally, the required dose of the inhibitor with a nanostructured delivery system is greatly reduced compared to the dose of an inhibitor without the liver targeted nanostructured delivery system. The present invention provides for the first time a treatment of septic cholestasis itself.

For treating septic cholestasis as a condition with an underlying systemic infection, i.e. sepsis, it is not advisable to suppress the immune system. The present invention therefore describes a polymethine dye-driven selective delivery system for the targeted transport of inhibitors of the PKC signaling pathway, into the liver with a negligible systemic immune suppressive effect, because they selectively act in the liver where they specifically modify only the bile excretion and are capable to resolve the cholestasis. By this way, the agents of this invention, i.e. inhibitors of the PKC signaling pathway/inhibitors of the PKC activity, are administered in much lower doses compared to an untargeted counterpart, are selectively transported to the exclusively to the place of action and therefore are suitable for the treatment of septic cholestasis. Accordingly, the present invention represents a highly effective way for treating septic cholestasis, wherein systemic, adverse effects which generally occur when kinase inhibitors are administered in the state-of-the-art treatments of infections, are greatly reduced.

The term "agent(s)" or "therapeutic agent(s)" according to the invention means inhibitors of the PKC signaling pathway; further, the term "agent" or "agents" is used synonymously to the terms "anti-cholestatic agents" and "choleretic agents" as well as "drug" or "drugs". Furthermore, the terms "agent(s)" and "drug(s)" are used synonymously according to the invention.

If the nanostructured delivery system according to the invention comprises at least one polymer, it is referred to herein as "nanoparticle"; if it comprises at least one lipid, it is referred to herein as a "liposome." If the nanostructured delivery system according to the invention comprises both polymers and lipids, it is also referred to herein as "nanoparticle" or as "liposome". If the nanostructured delivery system according to the invention comprises at least one polymer and at least one nucleic acid construct, it is also referred to herein as "polyplex", According to the invention, nanoparticle, liposome, virus-like particle as well as polyplexes, lipoplexes and peptoplexes relate to the nanostructured delivery system.

Nanoparticles may be constructed of a plurality of molecules. These nanoparticles may consist of polymers wherein these polymers are characterized by the fact that certain units (monomers) are repeating units. The polymers are covalently bonded to one another by the chemical reaction of these monomers (polymerization). If some of these polymers have hydrophobic properties, they may form nanoscale structures (e.g., nanoparticles, micelles, vesicles) in an aqueous environment. Due to their hydrophobic properties, lipids may also be used to form nanoparticles (micelles, liposomes).

If the nanostructured delivery system according to the invention comprises at least one positively charged polymer, which is complexed with negatively charged genetic material, it is referred to herein as "polyplex"; if it comprises at least one positively charged lipid, and negatively charged genetic material, it is referred to herein as a "lipoplex" and if it comprises at least one positively charged peptide, and negatively charged genetic material, it is referred to herein as a "peptoplex".

Polymethine dyes or polymethine-like dyes, like Indocyanine green (ICG), are known to interact with several Organic Anion Transporting Polypeptides (OATPs), which are mainly located in the liver. Therefore, ICG is widely used for functional investigations of the liver. The so called Indocyanine green plasma disappearance rate reflects the ability of the bile excretion rate and is used as a standard method in the clinics.

Additionally, it is known that some polymethine dyes or polymethine-based dyes, like Indocyanine green (ICG), can be used as photosensitizers in cancer therapy, because these compounds generate singlet oxygen and free radicals upon excitation by light. Therefore, such dyes are often described for the diagnosis as well as model compounds for photodynamic therapy of cancer.

It is advantageous that almost all dyes, regardless of their structure, accumulate in cancer tissue due to the so-called "enhanced permeability and retention-" or EPR-effect of the spontaneously formed dye-liposome conjugates (Ngoune et al., *Accumulating nanoparticles by EPR: A route of no return*, J. Contr. Rel. 2016,).

The EPR effect means that tumor tissue is usually characterized by enhanced angiogenesis, and a leaky vascular structure which facilitates the entrance of nanoparticles or albumin particles. Additionally, the lymphatic flow is usually strongly reduced in tumor tissue. These two factors finally are responsible for the accumulation of particles, like liposomes and albumin- or lipoprotein-conjugated small molecules. If such particles accumulate in tumor tissue, this process is referred to as "Passive Targeting", because no active carrier- or transport systems are involved. The EPR effect is widely exploited in cancer therapy and diagnosis:

For diagnostic reasons, dyes (e.g. Evans Blue, ICG, Toluidine Blue, Fluorescein)

For the photodynamic therapy of tumors, some NIR-Dyes, which form complexes with lipoproteins or albumins are used.

For an enhanced tumor therapy, drugs are encapsulated into liposomes or particles to enhance the accumulation in tumor tissue. E.g. the approved drug Doxel®.

Keeping the EPR effect in mind, it is obvious that this kind of targeting is not an active process and the mentioned dyes cannot be used for an active tumor targeting, even if particles, containing these dyes accumulate in the tumors.

However, some polymethine-based dyes, like Indocyanine green (ICG) are actively and rapidly taken up into the liver by OATP-mediated endocytosis, and it might be considered to make use of this property for an active hepatocyte/liver targeting. However, by chemical means, it is not possible to bind ICG to a polymer or a lipid to engineer an actively liver/hepatocyte targeted nanostructured delivery system, because the end of the alkyl-chains comprises two sulfonate residues, which represent "dead ends" for a chemical modification or coupling.

Therefore, it is a crucial step of this invention to design and synthesize polymethine dyes with a modified ICG-like scaffold that can be connected to other chemical moieties (i.e. polymers, proteins, small molecules) with known coupling reaction methods. Moreover, the dyes are designed in a way that after coupling the net charge is −1 or +/−0.

The inventors found that hepatocyte targeting of ICG or ICG-like polymethine dyes is highly dependent on the ratio of the net charge of the molecule under physiological conditions and the surface or shape of the molecule; and not only on the scaffold. When an ICG-like polymethine dye is coupled to a polymer or lipid or carrier with a functional group, the net charge of the uncoupled functional group is lost during the coupling reaction. Hence, the ratio between net charge at the dye molecule changes during coupling and the hepatocyte targeting is reduced or lost.

For the design of an ICG or ICG-like polymethine dye, which is covalently attached to a polymer or lipid or carrier, it is therefore necessary to either use a coupling position, which does not contribute to the charge, or introduce an additionally charging group, if a charging group is used for the coupling reaction. Functional groups that produce a negative net charge under physiological conditions are preferably sulfate, sulfonate, sulfonamide, phosphate, phosphonate, borate, boronate, $BR_4^-$, perchlorate, or carboxylic acids, strongly CH—, OH—, or NH-acidic groups. Functional groups that produce a positive net charge under physiological conditions are preferably amines, quaternary salts, guanidines, amidines and their respective quaternary salts, oxonium ions, pyridinium salts, pyridine. All these groups might also be part of a cyclic structure. (e.g. in indolinium ions, tetrazolium- or cyclic oxonium ions, pyrylium salts). It might also be applicable to use metal salt complexes to generate a permanent charge (e.g. complexed zinc).

For the OATP-mediated targeting of the hepatocytes, the inventors found that the overall charge of the bound construct should be zero or −1. Since the chemical nature of the compounds inherently yields one permanent positive charge at the indole nitrogen, this could be compensated by permanently charged residues like sulfonate or phosphonate-residues. Hydrogenphosphate esters or hydrogen sulfate esters are also possible, but less stable. General structures I and II of as shown in FIG. 2 and comprised in the claims show structures of polymethine dyes with two indole moieties.

The cell selectivity of polymethine dyes of the invention is obtained through the specific interaction of the polymethine dye, which is coupled to the nanoparticle or the liposome or the virus-like particle and is detected by the liver-specific influx transporter. Influx transporters for the polymethine dyes according to the invention have been defined for hepatocytes.

Polymethine dyes according to the invention, which are taken up specifically by influx transporters of the basolateral membrane of hepatocytes, make the nanoparticle specific for hepatocytes. According to current information and the FDA, the following exemplary listed transporters fall under the influx transporters of hepatocytes:

| Name | Gene |
| --- | --- |
| OATP1B1, OATP-C, OATP2, LST-1 | SLCO1B1 |
| OATP1B3, OATP8 | SLCO1B3 |
| OATP2B1 | SLCO2B1 |
| OATP1A2 | SLCO1A2 |
| NaDC3, SDCT2 | SLC13A3 |
| NTCP | SLC10A1 |
| OCT1 | SLC22A1 |
| OCT3 | SLC22A3 |
| OAT2 | SLC22A7 |
| OAT1 | SLC22A6 |
| OAT3 | SLC22A8 |
| PGT | SLCO2A1 |

Consequently, a preferred embodiment of the invention relates to inhibitors of the PKC signaling pathway for use in the treatment of septic cholestasis, wherein the at least one polymethine dye has at least one tissue-specific transporter, which triggers the uptake of the nanostructured delivery system into the cells of the target tissue. According to a further preferred embodiment of the invention, said at least one tissue-specific transporter is selected from the group consisting of OATP1B1, OATP-C, OATP2, LST-1, OATP1B3, OATP8, OATP2B1, OATP1A2, NaDC3, SDCT2, NTCP, OCT1, OCT3, OAT2, OAT1, OAT3, PGT, OCT2, OAT1, OATP4A1, OATP4C1.

A polymethine dye or polymethine targeting moiety (PTM) according to the invention relates to a chemical polymethine (trimethine, pentamethine or heptamethine structure (see FIGS. 1 and 2), which is recognized by special surface molecules (OATPs), preferably the OATP1B2 or the OATP1B3, OATO2B1 and the NTCP. Upon recognition the nanostructured delivery system together with the PTM becomes internalized or endocytosed, preferably by a clathrin-mediated mechanism.

According to the invention, the term "polymethine dye" is used synonymously with the term "polymethine targeting moiety (PTM). Further synonymously used terms are "polymethine dye targeting moiety", "polymethine-based targeting moiety", "polymethine-like targeting moiety". All these terms have the same meaning.

The terms "tissue-specific transporter," "transporter" and "influx transporter" are used synonymously according to the invention.

To connect the polymethine-targeting moiety (PTM) to the nanostructured delivery system or to the PKC reducing agent, construct or polymer, the known standard methods depicted in FIG. 3 can be used. To change the connecting points of the PKC reducing agent, construct or polymer, standard methods can be applied; the most common standard methods, are shown in FIG. 4 describing the interconversion of a carboxylic acid into an amine, an alcohol into a carboxylic acid or into a maleimide. A detailed exemplified procedure to interconvert a carboxylic acid derivative into an amine or a maleimide is described in Example 2 and is illustrated in FIG. 6. For individual application, the most efficient and synthetically feasible targeting has to be investigated, for example in a suitable model for tissue endocytosis like a chip-based microfluidic model (exemplified in Example 7).

In an especially preferred embodiment, the inhibitors of the PKC signaling pathway for use in the treatment of septic cholestasis are selected from the group consisting of PKC inhibitors, PI3 kinase inhibitors, MAPK inhibitors, PLC inhibitors, DAG level reducing agents, siRNA, miRNA, shRNA, modified oligo analogues (e.g. morpholinos), antisense constructs and RNAse H.

The inhibitors siRNA, miRNA, shRNA, modified oligo analogues (e.g. morpholinos), antisense constructs and RNAse H according to the invention relate to oligonucleotide constructs capable to silence the respective genes (e.g. silence of PKC gene, PI3 Kinase gene, MAPK gene, PLC gene) which can be constructed by gene silencing techniques well known in the art. These inhibitors can also be designated as PKC siRNA, PKC shRNA, PKC miRNA, PI3 kinase siRNA, PI3 kinase shRNA, PI3 kinase miRNA.

According to the invention, inhibition of PKC activity can also be achieved with appropriate gene editing methods like CRISPR/Cas, TALEN, zincfinger nucleases.

In a preferred embodiment, the inhibitors of the PKC signaling pathway for use in the treatment of septic cholestasis are PKC inhibitors selected from the group consisting of bisindolylmaleimides, staurosporine, midostaurin, UCN-01, sotrastaurin, enzastaurin, ruboxistaurine, tivantinib, enzastaurin, Gö 6983, K252a, ANA-12, lestaurtinib, stauprimide, CEP-701, Arcyriaflavin A, chelerythrine chloride, and Bisindolylmaleimids I-XII aka BIM I-XII.

In a preferred embodiment, the inhibitors of the PKC signaling pathway for use in the treatment of septic cholestasis are PI3 kinase inhibitors selected from the group consisting of copanlisib, idelalisib, wortmannin derivatives, bryostain derivatives, taselisib, omipalisib, AS605240, GSK1059615, buparlisib, alpelisib, pictilisib, serabilisib, dactolisib, dihydrosphingosine, calphostin C and melittin. Preferred inhibitors of the invention also comprise novel research compounds exhibiting PI3 kinase inhibitory effects.

The agents of the invention, i.e. inhibitors of the PKC signaling pathway, can either be directly coupled to a spacer or linker comprising an aliphatic, heteroaliphatic, aromatic, heteroaromatic, linear, branched or cyclic assembly of atoms, and/or a polymethine targeting moiety or coupled to a suitable carrier like nanoparticles, liposomes or virus like particle, in which these agents are encapsulated or trapped (see, for example, FIG. 1).

The inventive polymethine targeting moiety as selective liver targeting moiety can be attached to the agent of the invention (i.e. inhibitor direct or suitable carrier) by regular chemical coupling reactions, which are well-known in the state of the art, and preferably by activated carboxylic acid derivatives (e.g. anhydrites, acyl halides, active esters) and subsequent coupling to amines, by photo-induced thiol-ene click reaction, by Michael addition (1,4-addition), cycloaddition reactions, Huisgen reaction (e.g. 1,3-cycloaddition of alkynes to azides), Diels-Alder reaction (e.g. trans-cyclooctene coupling to tetrazine derivatives), mono- or dihalogenated triazines, aziridines, epoxides, sulfonyl halides, imido esters, phosphoramidite, maleimide-thiole reaction, isocyanate-, isothiocyanate coupling, carbodiimide coupling, halo-acetamide coupling. Alternatively, reactive carbonyl compounds, preferably ketones, aldehydes acetals or hemiacetals with amines to form a Schiff-base, which can be reduced to a corresponding amine, can be used according to the invention (see, e.g., FIG. 3).

The term "nanostructured delivery system" according to the invention is characterized by at least one polymethine targeting moiety (PTM) and at least one polymer and/or at least one lipid and/or at least one virus-like particle, which delivers the therapeutic agent, i.e. inhibitors of the invention, into a target tissue, comprising contacting a target tissue with said nanostructured delivery system.

The at least one polymethine targeting moiety (PTM) as a targeting unit triggers the active and selective transport of the nanostructured delivery system into the target tissue.

The at least one polymethine targeting moiety (PTM) further triggers the uptake of the nanostructured delivery system into the cells of the target tissue by interacting with the cell surface and accumulating the nanostructured delivery system on the cell surface.

The term "nanostructured delivery system" according to the invention also relates to polyplexes, which have to be understood as complexes between a negatively charged nucleic acid construct ligated to a positively charged polymer. The terms "nanostructured carrier system" and "nanostructured delivery system" are used synonymously according to the invention.

The inventive nanostructured delivery system comprises a combination of a nanostructured carrier and a polymethine targeting moiety. The nanostructured carrier system comprises at least one polymer and/or at least one lipid or virus-like particle and is capable of carrying an active ingredient—according to the invention a PKC activity inhibiting or reducing agent (inhibitor of the PKC signaling pathway) like a vehicle. These nanostructured systems can be detected and characterized by methods known in the art, such as DLS, AUC, AF4, DSC, ITC, XRD, SANS, SAXS or special microscopic methods like SEM, STEM or cryo-TEM, AFM. The shape can be preferably, but not limited thereto, either spherical, oval, rod-like, barrel-like, disc-like or polyhedral. The size preferably varies from 1 nm to 800 nm.

In a preferred embodiment, the at least one polymer, lipid, virus-like particle and/or active agent contains functional groups, which allow chemical modifications and the attachment of a polymethine targeting moiety (PTM) (see, e.g., FIG. 4). The polymer might be organic or inorganic and fixes the therapeutic agent like a vehicle. Inorganic particles might be functionalized by silanization with functionalized silanes like aminopropy-trimethylsilane (APTES), which introduces amine functions to oxides.

In a preferred embodiment of the invention, the at least one polymer is selected from the group consisting of polyesters, polyacrylates, polystyrene derivatives, polyamides, polyurethanes, polyacrylonitriles, polytetrafluoroethylenes, silicones, silica particles, cerium oxide aluminum oxide or apatite particles, polyethylene glycols, polyethylene oxides and polyoxazolines and their copolymers, preferably in a variety of compositions such as random, gradient, alternating, block, graft or star copolymers. More preferred the at least one polymer is an organic, inorganic, hydrophobic, hydrophilic, amphiphilic, anionic and/or cationic polymer.

The polymer is even more preferably selected from the group consisting of PLGA, PLA, PCL, PGA, PDMAEMA, PMMA, PMAA, PEI, PEtOx, PEG, HPMA, APMA, PVP, hydrolyzed PVP, polysaccharides, such as arabinogalactan, chitosan, pullulan, alginate, cellulose or starch derivatives. Polymer according to the invention also comprise inorganic polymers, which can form porous particles, capable for trapping/encapsulating of active ingredients, preferably silica-based, alumina-based, titanium oxide-based, cerium oxide-based, carbon-based, zeolite-based, or apatite-based.

In a preferred embodiment of the invention, the at least one lipid is selected from the group consisting of saturated and unsaturated fatty acids, cholesterol derivatives, phospholipids, sphingolipids, lipoproteins and glycolipids.

The at least one polymer and/or at least one lipid according to the invention is/are preferably a biocompatible polymer and/or lipid.

The nanostructured delivery system preferably comprises a virus-like particle, e.g. a protein or protein shell. Such virus-like particle preferably comprises a protein shell, preferably, but not limited thereto, derived from the following viruses: Bacteriophage MS2, Bacteriophage Qβ, Enterobacteria phage P22, Cowpea mosaic virus (CPMV) Cowpea Chlorotic Mottle Virus (CCMV), hepatitis B virus carries (HBVc), Adeno associated virus (AAV). The proteins are obtained by transfection of the respective virus-genetic material into a suitable expression system like *Saccharomyces cerevisiae* by methods well-known in the art.

Consequently, in a preferred embodiment of the invention, the at least one virus-like particle is derived from a virus selected from the group consisting of Bacteriophage MS2, Bacteriophage Qβ, Enterobacteria phage P22, Cowpea mosaic virus (CPMV) Cowpea Chlorotic Mottle Virus (CCMV), hepatitis B virus carries (HBVc) and Adeno associated virus (AAV).

The invention will be illustrated in more detail with reference to the Figures, which not have to be understood to limit the scope of the invention.

FIG. 1 shows an exemplary building block to generate/prepare various different nanostructured delivery systems, useful for the treatment of septic cholestasis. FIG. 1 A shows a variety of potential compounds, which reduce PKC activity; FIG. 1 B shows some representative polymethine dye targeting moieties (PTMs); FIG. 1 C shows examples for targeted nanostructured delivery systems.

FIGS. 2A and 2B shows the Markush formulae of the claimed polymethine dyes, preferably useful as Polymethine-based Targeting Moieties (PTMs)

FIG. 3 shows examples for polymethine targeting moieties (PTMs) useful for hepatocyte targeting, wherein "R" represents a possible connection point for the carrier system (polymer, virus-like particle, lipid or a genetic construct). FIG. 3 further demonstrates a general synthetic approach for the synthesis/attachment of polymethine targeting moieties (PTMs) to agents, agent constructs, carrier polymers, virus-like particles or linkers.

FIG. 4 demonstrates exemplified methods to introduce and/or change functional groups for the attachment of an agent/agent construct, polymers and targeting moieties.

FIG. 5 shows the scheme to synthesize two representative PTMs (PTM1 and PTM2), suitable for coupling to a nanostructured delivery system for liver targeting. The detailed protocols are given in Example 1a and 1b. A similar procedure can be adopted for the synthesis of various PTMs.

FIG. 6 gives an example how a COOH functionalized PTM can be converted into a respective amine-(7a) or maleimide functionalized (13a) PTM. The detailed procedure is given in Example 2.

FIG. 7 shows the coupling of amino-terminated PTM (7a) to the terminal carboxylic acids from PLGA. The detailed procedure is given in Example 3.

FIG. 8 shows strategies for the direct coupling of nucleic acid material to the maleimide functionalized PTM (13b). FIG. 8 A: 3'EndLabeling strategy mainly for DNA-like constructs; FIG. 8 B: 5'EndLabeling strategy for DNA, RNA or modified nucleotides. The detailed procedure is given in Example 4.

FIG. 9 demonstrates methods for the preparation of nanoparticles by emulsion, double emulsion and nanoprecipitation. FIG. 9 A: Double-emulsion, FIG. 9 B: Emulsion; FIG. 9 C: Nanoprecipitation (dropping).

Figure 3:
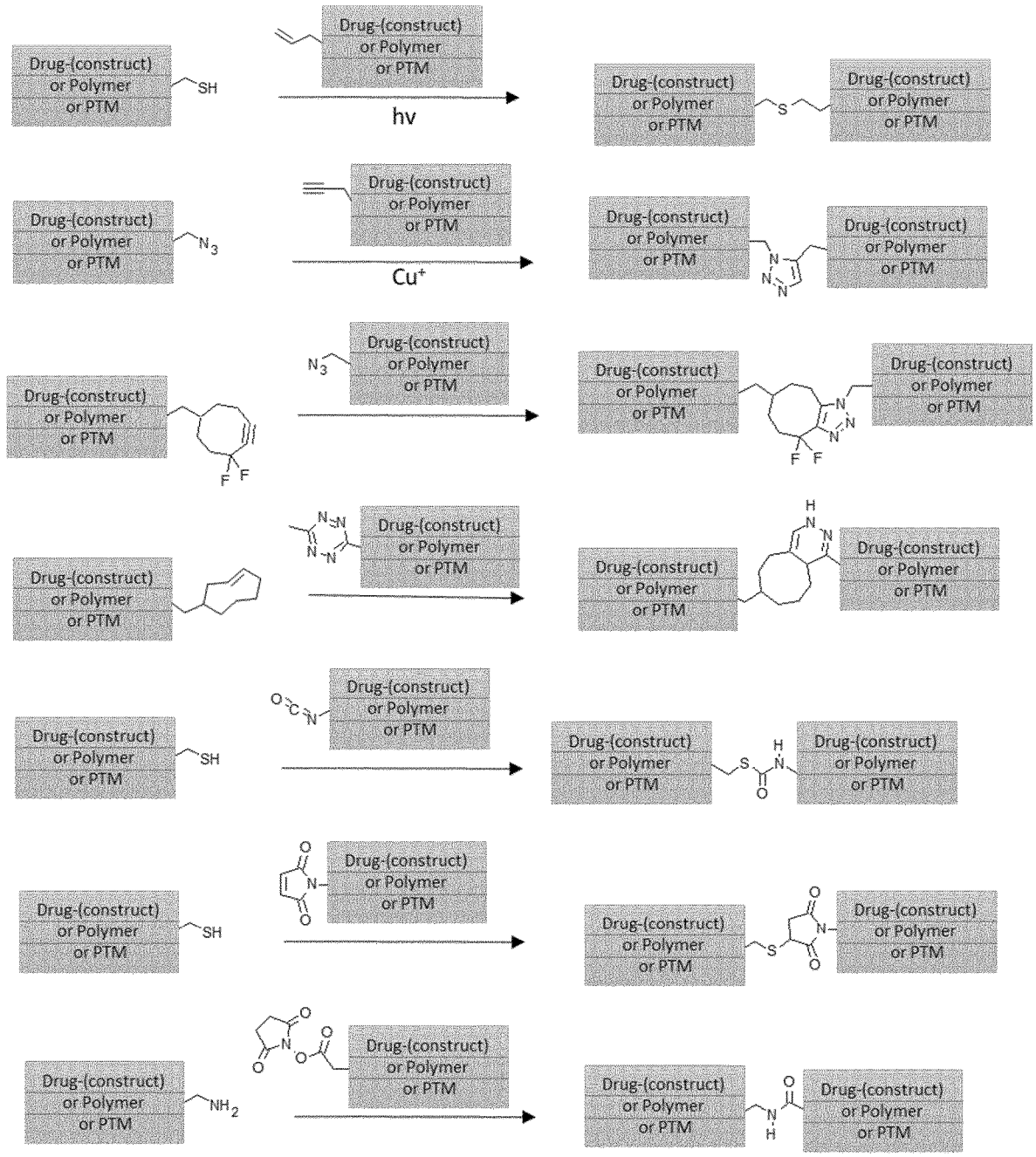
Figure 3:
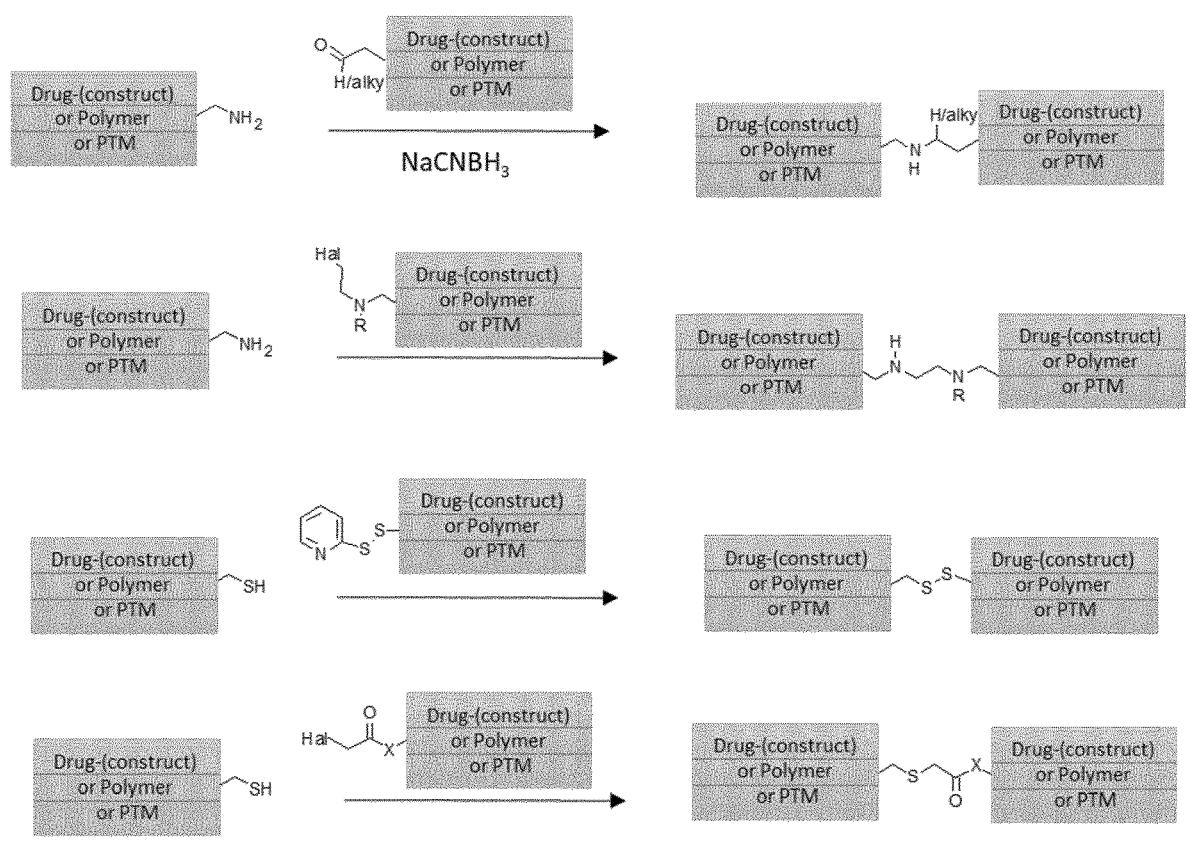

FIG. 1 A-C shows an exemplary building block to prepare various different nanostructured delivery systems according to the invention, which are useful for the inventive treatment of septic cholestasis. FIG. 1 A shows different PKC-activity reducing agents which might be used in the building block. These PKC-activity reducing agents as well as small molecules and also nucleic acid constructs can be used according to the invention. FIG. 1 B shows different preferred polymethine targeting moieties (PTM), which can be used according to the invention. The blue dots represent the connection points to the agent/agent construct or polymer. Possible chemical bindings are shown in FIG. 3. FIG. 1 C shows different carrier systems which carry the polymethine targeting moiety (shown as asterisks). On the top, a polymer (organic or inorganic), lipid, virus-like particle is shown, which can act as a vehicle for the targeted drug delivery. Basically, the PTM can be linked to small molecules, nucleic acid constructs and also polyplexes between nucleic acid construct and a positively charged polymer. Such positively charged polymers can also be labelled with a polymethine targeting moiety (PTM) of the invention and hence also form after ligation to nucleic acid constructs, a targeted nanostructured delivery system by themselves. Such targeted nanostructured delivery systems are preferably formed, if the PTM is directly bound to the inventive inhibitors of the PKC signaling pathway (preferably nucleic acid constructs) and these constructs form a nanostructured delivery system (with or without helper polymer).

The polymethine dye-based targeting moiety comprises a chemical moiety, which is recognized by certain recognition unit, preferably an OATP or a solute carrier transporter protein. For the recognition, a balanced charge of the molecule is important. In a preferred embodiment, after coupling to the final construct/carrier, the PTM's net charge is +/−0 or −1. In FIG. 1 B some representative Polymethine Targeting Moieties (PTM) are shown.

Figure 1A:
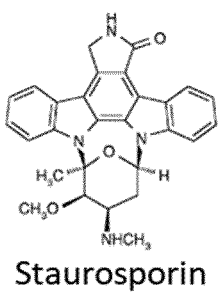
Figure 1A:
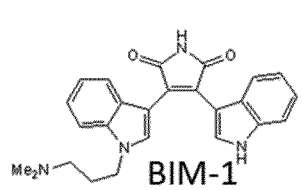
Figure 1A:
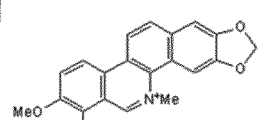
Figure 1A:
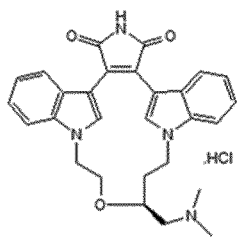
Figure 1A:
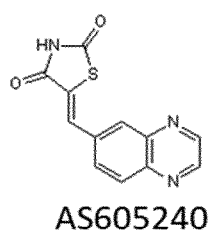
Figure 1A:
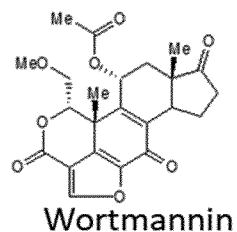
Figure 1A:
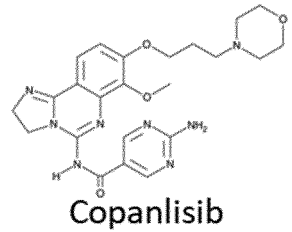
Figure 1A:
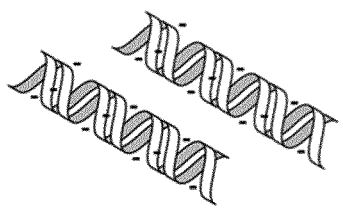
Figure 1A:
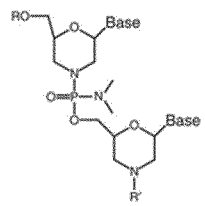
Figure 1A:
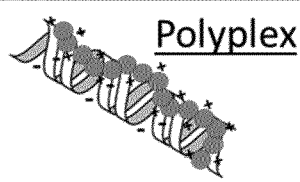
Figure 1B:
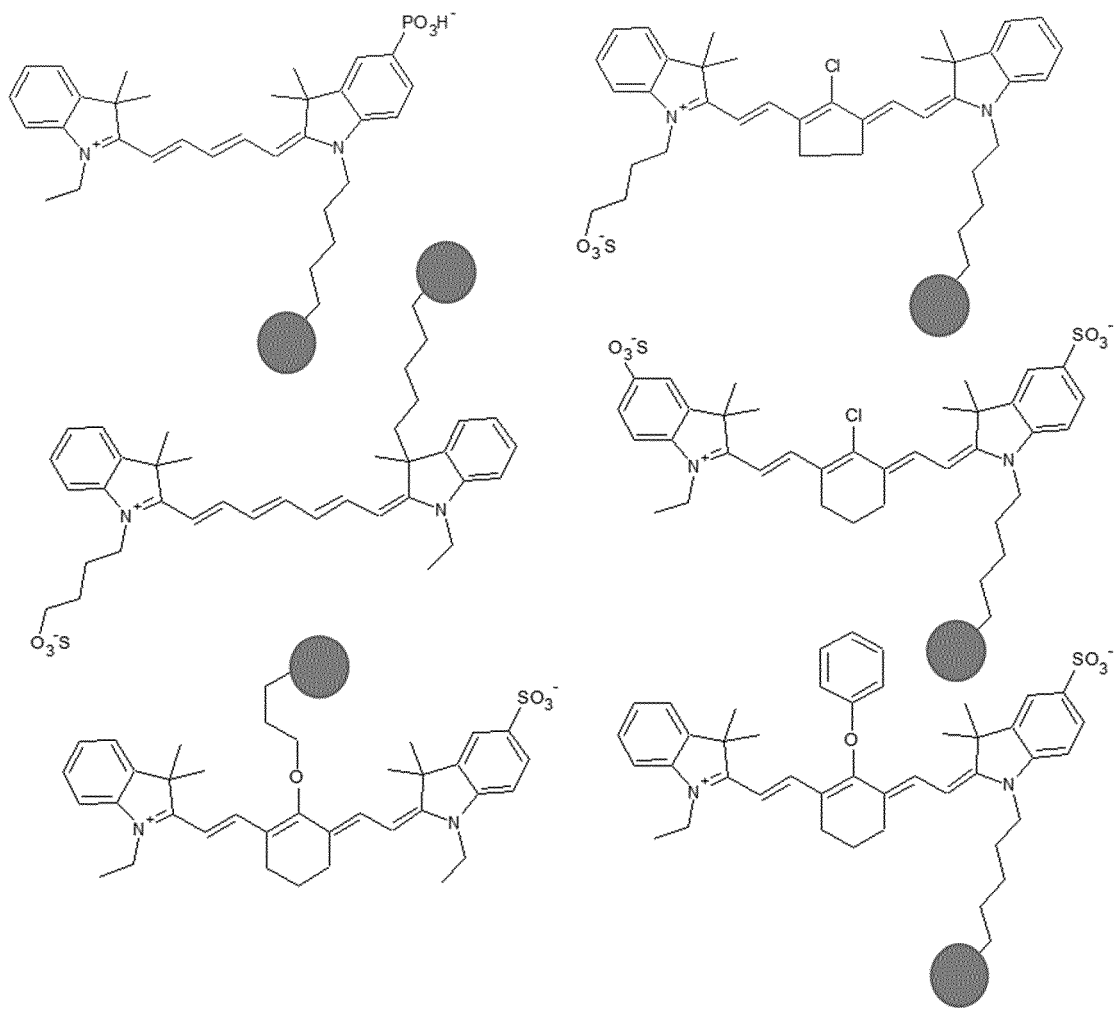
Figure 2A:
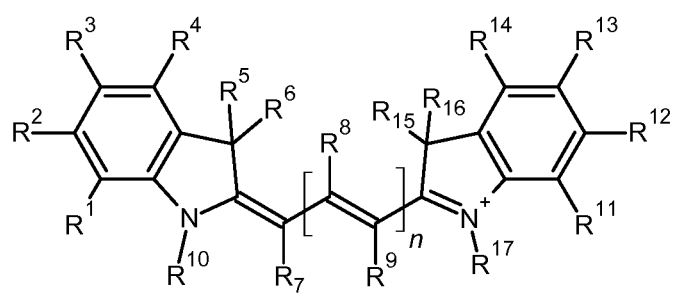
Figure 2B:
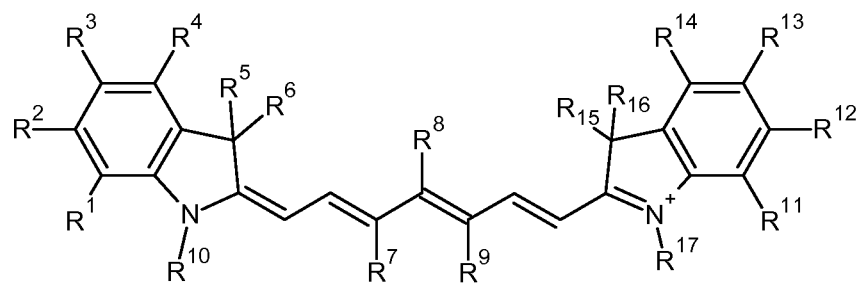

FIGS. 2 and 3 show the structures of inventive polymethine dyes with two indole moieties. FIG. 2 shows the general structure I or II symmetrical or asymmetrical polymethines according to the invention, where a.) n stands for the numerical values 0, 1, 2, 3, 4, 5, 6, 7, 8, 9 or 10, b.) R1-R17 may be the same or different and maybe hydrogen or deuterium, one or more alkyl, tert-alkyl, cycloalkyl-(the "alkyl" and "cycloalkyl" radicals also include olefinic structures) or aryl, carboxyaryl, dicarboxyaryl, heteroaryl or heterocycloaliphatic radicals, alkyloxy, alkylmercapto, arlyoxy, arylmercapto, heteroaryloxy, heteroarylmercapto groups, a hydroxyl, halogen, nitro or cyano group, an alkyl-substituted or cyclic amine function and/or two ortho-position radicals, e.g., R3 and R4, R13 and R14 and/or R1 and R2 and R11 and R12 and/or R7 and R9, together may form an additional aromatic, heteroaromatic, aliphatic or heteroaliphatic ring, c.) at least one of the R1-R17 substituents has a solubilizing and/or ionizable or ionized substituent such as $SO_3^-$, ($-SO_3H$), $PO_3^{2-}$, COOH, OH or $NR_3^+$, cyclodextrins or sugar, which determines the hydrophilic properties of these polymethine dyes, wherein this substituent may also be bound to the polymethine dye by a spacer group, and d.) at least one of the R1-R17 substituents has a reactive group (linker) such as isocyanates, isothiocyanates, hydrazines, amines, mono- and dichloro- or mono- and dibromotriazines, aziridines, epoxides, sulfonyl halides, acid halides, carboxylic anhydrides, N-hydroxy-succinimide esters, imido esters, carboxylic acids, glyoxal, aldehyde, maleimide or iodacetamide and phosphoramidite derivatives or azides, alkynes or olefins, wherein this substituent may also be bound to the polymethine dye by a spacer group.

e.) the aromatic, heteroaromatic, aliphatic or heteroaliphatic spacer group consists of structural elements such as $[(CH_2)_a—Y—(CH_2)_b]_c$ or $[(C_6H_4)_a—Y—(C_6H_4)_b]$, where Y may be the same or different and comprises $CR_2$—, O—, S—, —$SO_2$, $SO_2NH$—, NR—, COO— or CONR functions, wherein it is bound to one of the R1-R17 substituents, and a.) and b.) may be the same or different and have numerical values of 0-18 and numerical values for c of 0-18, f.) the R8 and R9 substituents with corresponding n=2, 3, 4 or 5, may also be present 2×, 3×, 4× or 5×, and these may be the same or different.

FIG. 3 demonstrates examples for binding strategies for agent/agent constructs with the polymer or targeting moiety according to the invention. The inventive polymethine dye driven selective liver targeting moiety can be attached to the agent or agent construct of the invention by regular chemical coupling reactions as referred to above. For the coupling reaction, all the reactions, which are well known for a skilled person, i.e. a chemist, can be applied. In a preferred embodiment, reactive carbonyl compounds, preferably ketones, aldehydes acetals or hemiacetals with amines to form a Schiff-base, which can be reduced to a corresponding amine are used as shown in FIG. 3.

The polymethine moiety triggered endocytosis according to the invention can be adopted for the tissue specific transport of the agent itself. For this, the agent of interest is coupled with a moiety, suitable for the coupling reaction, which contains the polymethine dye for the active hepatocyte/liver targeting. According to the invention, the inhibitors of the PKC signaling pathway are coupled either directly or with a spacer comprising the polymethine dye as shown in FIG. 3 or ligand construct to the polymer or a nanostructured delivery system (i.e. polymer particle).

The polymethine dyes of the invention are responsible and the inventive tools for the targeted delivery and cell/tissue/organ specificity of the agent, i.e. inhibitor, agent construct or carrier. As outlined in FIGS. 1 B, 2 and 3, such recognition ligands can be seen as derivatives of ICG. They are useful for hepatocyte targeting.

To couple the polymethine dye targeting moiety to a drug (agent), drug construct (agent construct) or carrier, different approaches can be applied. Depending on the functional groups present in the respective drug, drug construct or inventive nanostructured delivery system and the respective recognition ligand, the most suitable method has to be evaluated.

Figure 4:
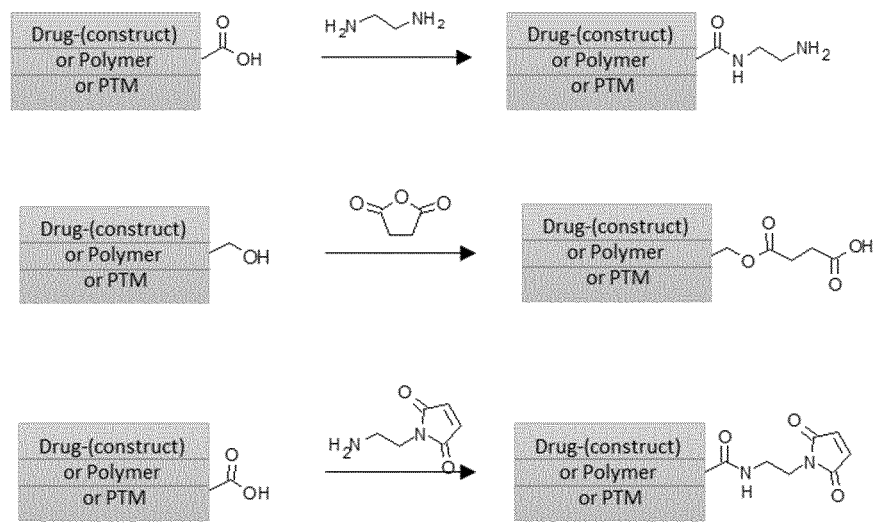

In case the direct coupling is difficult due to a lack of suitable connection points, suitable functional groups are preferably introduced according to generally known functional group interconversion methods as shown in FIG. 4 to link the agent/agent construct, or nanostructured delivery system to the polymethine targeting moiety. FIG. 4 shows the interconversion of carboxylic acid to amine, alcohol to carboxylic acid and alcohol to maleimide. The carboxylic acids are suitable for coupling with amines and vice versa, whereas maleimides can be coupled to thiols.

Figure 7:
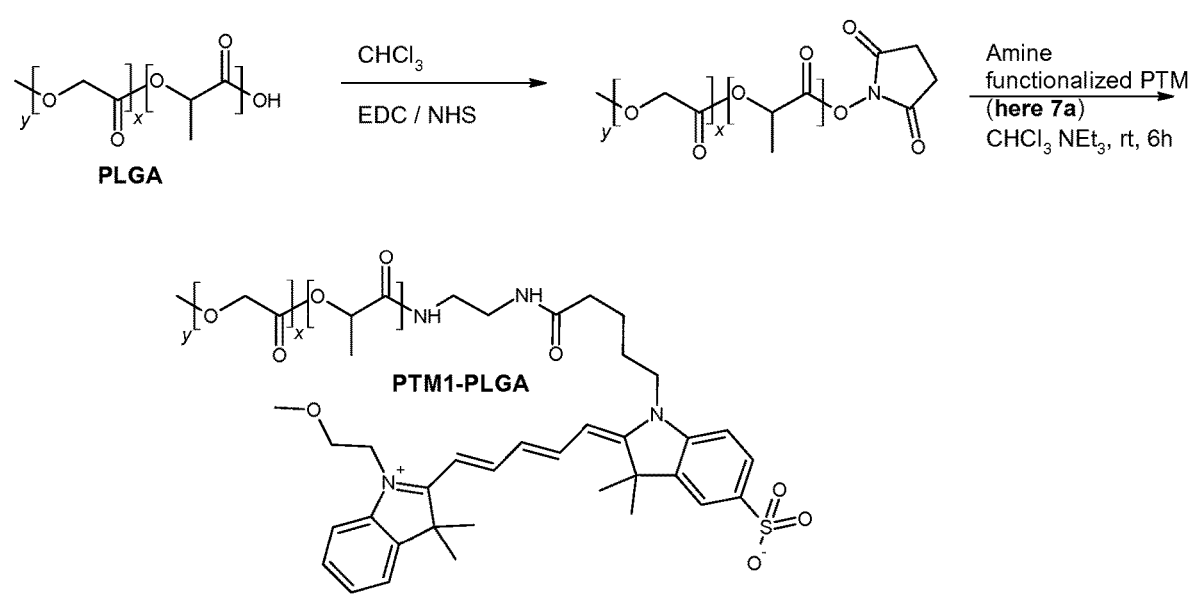
Figure 9:
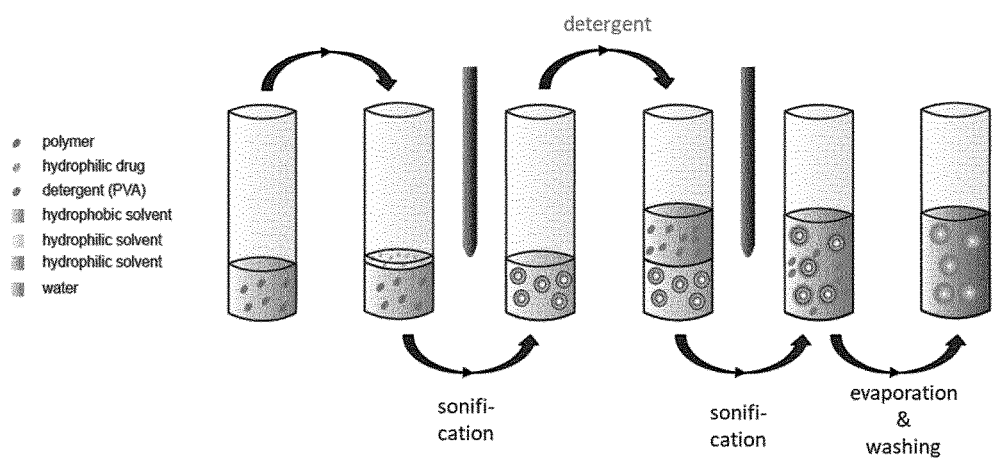
Figure 9:
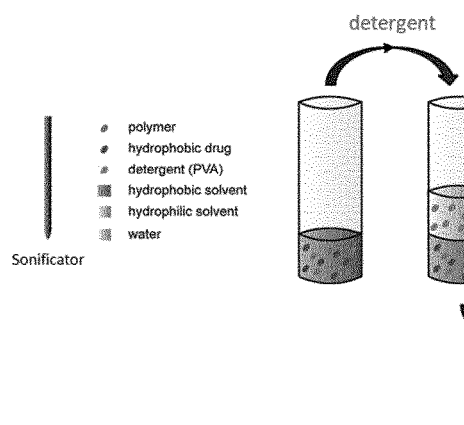
Figure 9:
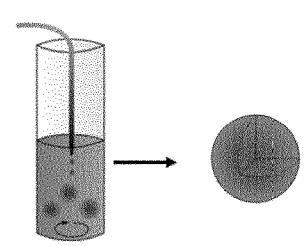

The polymethine targeting moiety can either be attached directly, or via additional spacers to increase the distance between targeting moiety and the agent/agent construct, polymer and/or carrier system. For the synthesis of Dye-PLGA, useful as nanocarrier, an exemplified synthesis is shown in FIG. 7. Further disclosure is given in Example 3. Polymethine dye labelled PLGA (FIG. 7 and Example 3) is useful for the encapsulation of the PKC-inhibiting agent preferably by nanoprecipitation, emulsion or double emulsion as, shown in FIG. 9 and described in Example 5.

Alternatively, the polymethine targeting moiety can be coupled to the final particle (nanostructured delivery system) after encapsulation of the inhibitor of the invention. In this case, the inhibitor of the PKC signaling pathway is encapsulated accordingly. After the preparation of the nanoparticle, the functional groups in the polymer are activated and coupled to the PTM analogously to the coupling as shown in FIG. 3. Depending on the functional groups on the polymer and the drug used, different coupling strategies can be applied. Such coupling strategies are well-known in the art and preferred and useful coupling strategies according to the invention are shown in FIG. 4.

This approach can be adopted to small molecules, nucleic acid constructs, like si-RNA, or inventive carriers, such as liposomes or nanoparticles, either organic or inorganic.

Figure 6:
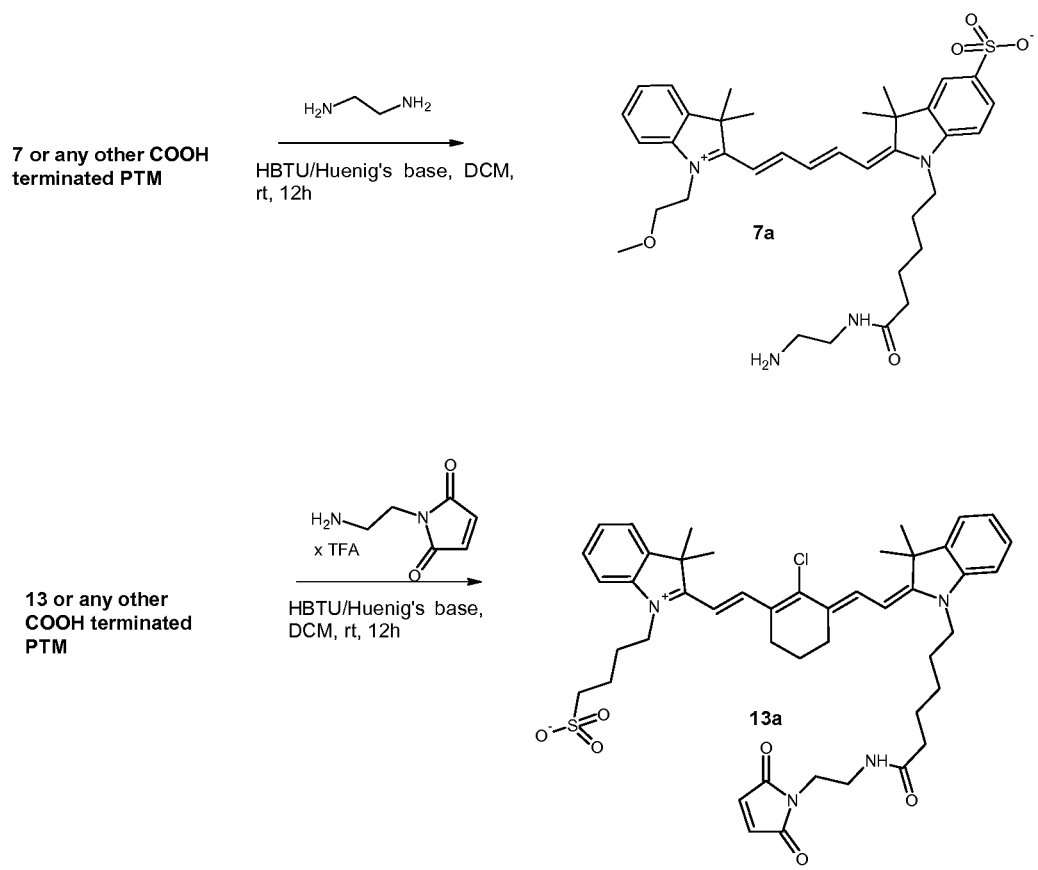
Figure 8:
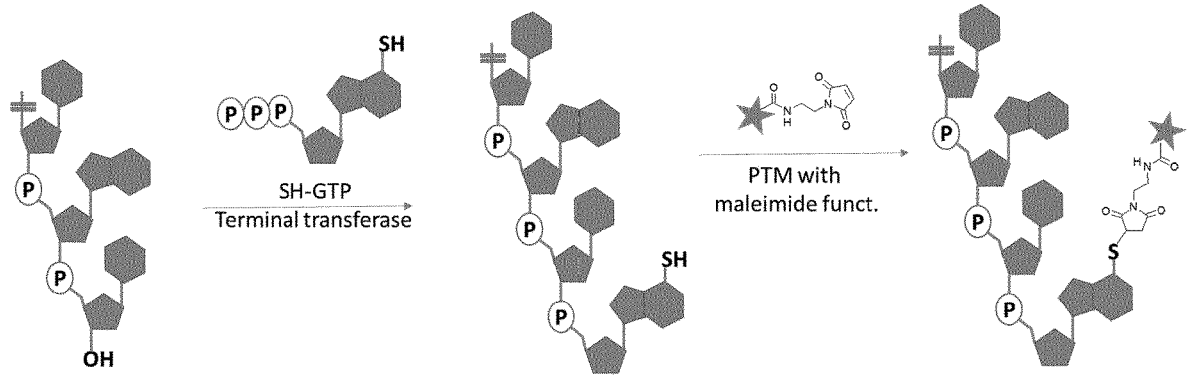
Figure 8:
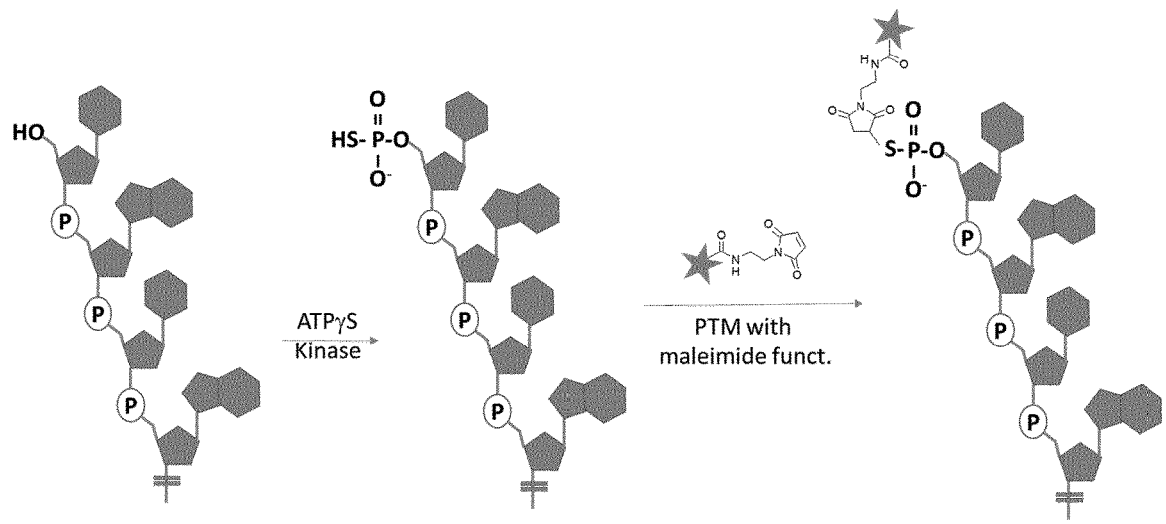

The polymethine targeting moiety (PTM) according to the invention is preferably attached to the polymeric moiety (polymer or virus like particle) of the nanostructured delivery system, but can also be directly attached to the inhibitor of the PKC signaling pathway before the formation of the nanostructured delivery system. For example, a polymethine targeting moiety (PTM) comprising a maleimide functional group is attached to the nucleic acid construct by known labelling methods like 3" or 5'EndTAG™ For both methods, the preferable functional group at the PTM is the maleimide, which can be generated as shown in FIG. 4. The two EndTAG coupling strategies to selectively couple nucleic acid constructs to the Polymethine Targeting Moiety (PTM) are shown in FIG. 4 and exemplified in FIG. 6. Strategies for the coupling of nucleic acid material to a PTM are shown in FIG. 8. FIG. 8 A shows 3'EndLabeling strategy mainly for DNA-like constructs; FIG. 8 B shows 5'EndLabeling strategy for DNA, RNA or modified nucleotides. The targeted nucleic acid constructs can be used to form polyplexes with polymers (organic or inorganic) in order to generate a nanostructured delivery system.

In order to mimic the septic cholestasis, a systemic inflammation was induced using the well-established peritoneal contamination and infection (PCI) model. In this model, a human faeces suspension is applied intraperitoneally (i.p.) and rapidly triggers sepsis with liver dysfunction.

For each batch of human stool, the dose is titrated carefully for a survival between 0% and 20% within two weeks.

Figure 11:
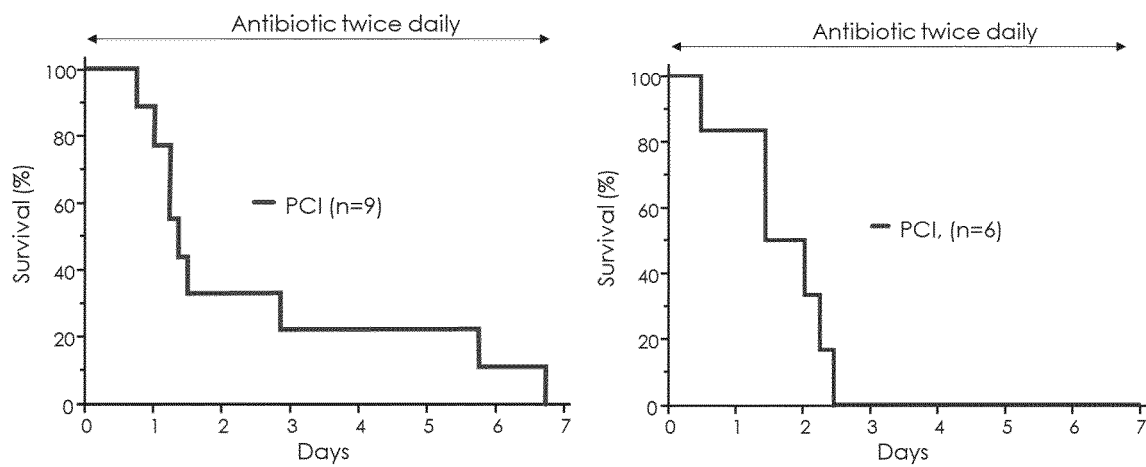
FIG. 11 shows Kaplan-Meier-Schätzer plots indicating the survival of mice in a peritoneal contamination and infection (PCI) model using two different batches of stool.

To find the adequate dose of stool, different doses were tested. 6 h after i.p. application of the stool, 8-12 weeks old C57/BL6 mice or FVB/N mice were treated with the nanoparticles or the free drug respectively. FIG. 11 shows the survival of mice with two different batches that were used in a Kaplan-Meier-Schatzer plot.

Figure 12:
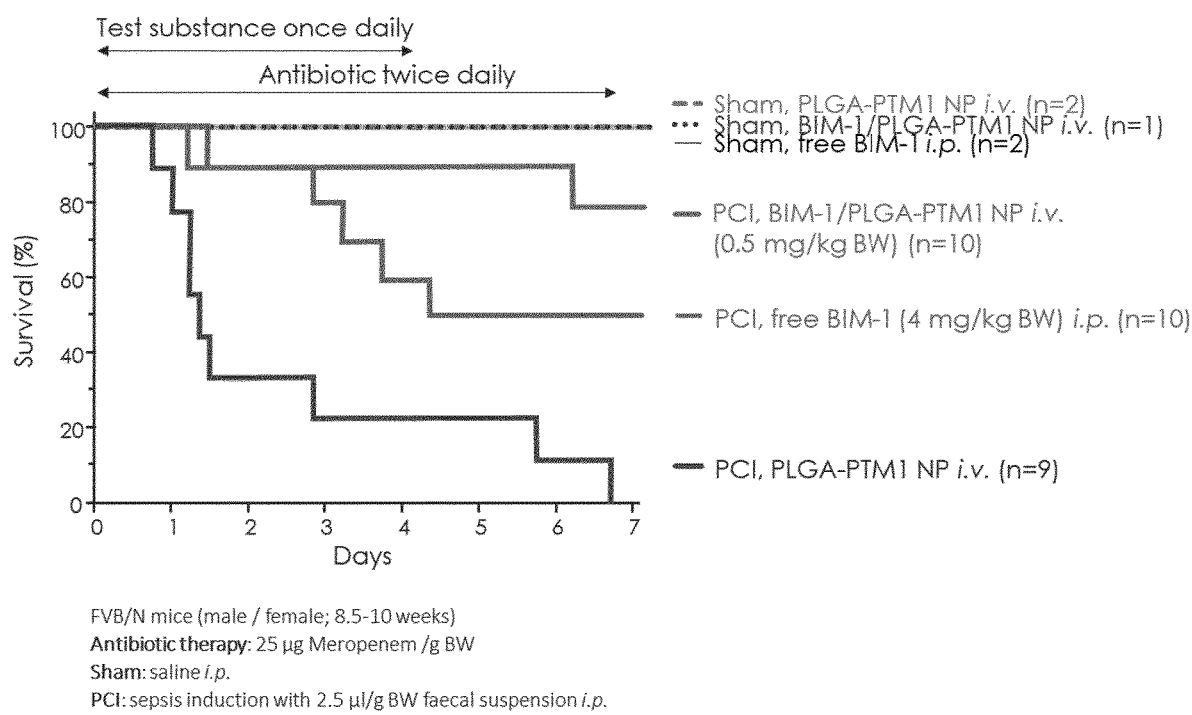
FIGS. 12, 13 and 14 show the survival rates of mice treated with PKC activity lowering compounds in Kaplan-Meier-Schätzer plots. The figures show the effects of the drug and the targeted nanostructured particles on healthy animals (sham) and on animals with PCI.
Figure 13:
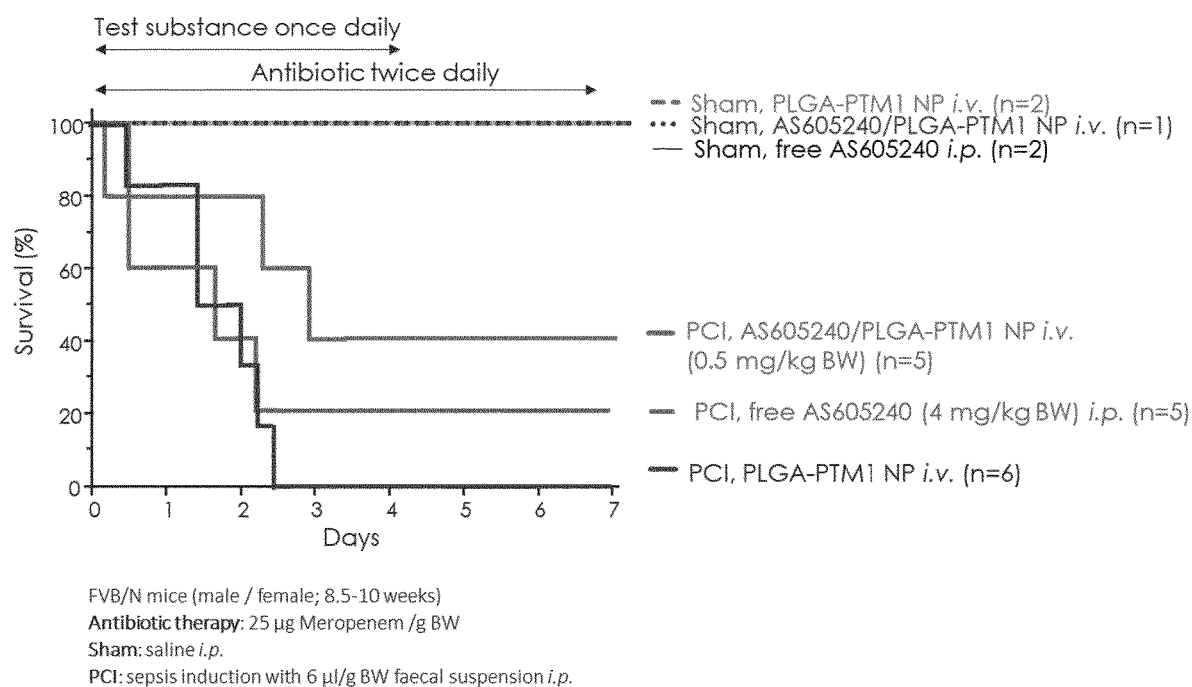
Figure 14:
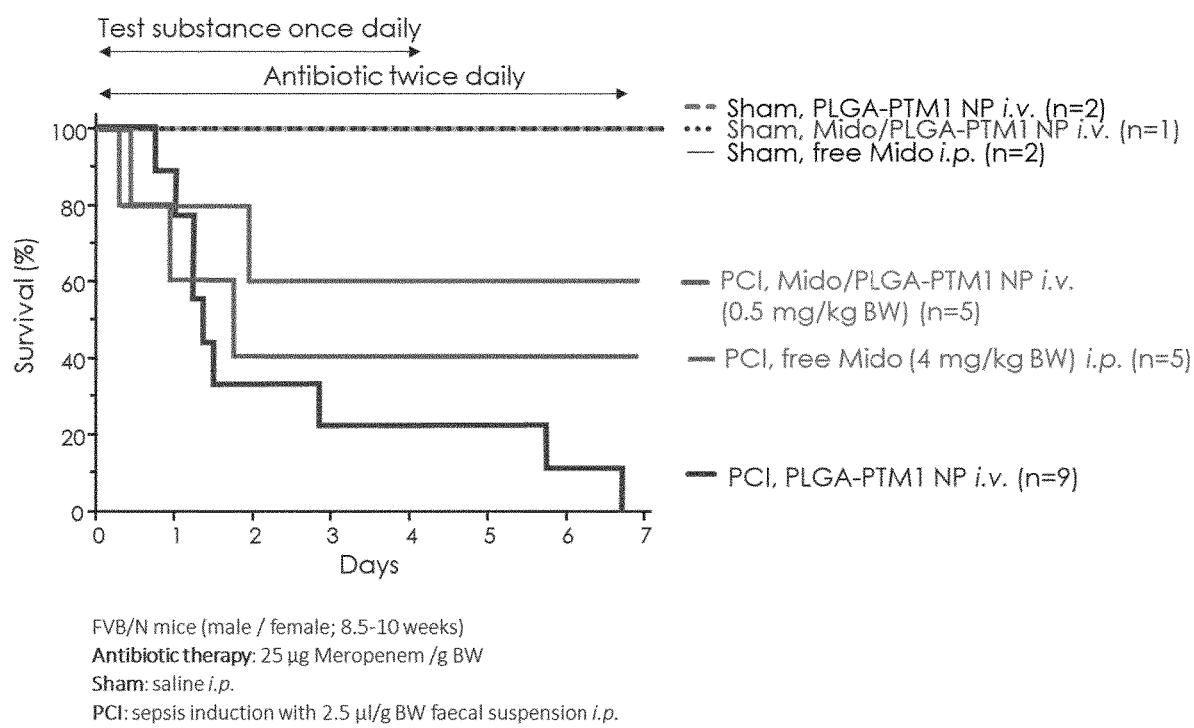

FIGS. 12, 13 and 14 show the survival rates of mice treated with PKC activity lowering compounds in Kaplan-Meier-Schatzer plots. The figures show the effects of the drug and the targeted nanostructured particles on healthy animals (sham) and on animals with PCI. FIG. 12 shows the effect of the PKC inhibitor BIM-1 as free drug and as cargo of a targeted nanoparticle formulation.

FIG. 13 shows the effect of the PI3-kinase inhibitor AS605240 as free drug and as cargo of a targeted nanoparticle formulation.

FIG. 14 shows the effect of the PKC inhibitor midostaurin as free drug and as cargo of a targeted nanoparticle formulation.

The invention is further demonstrated below on the basis of Examples, although it is not limited thereto.

EXAMPLES

Figure 5A:
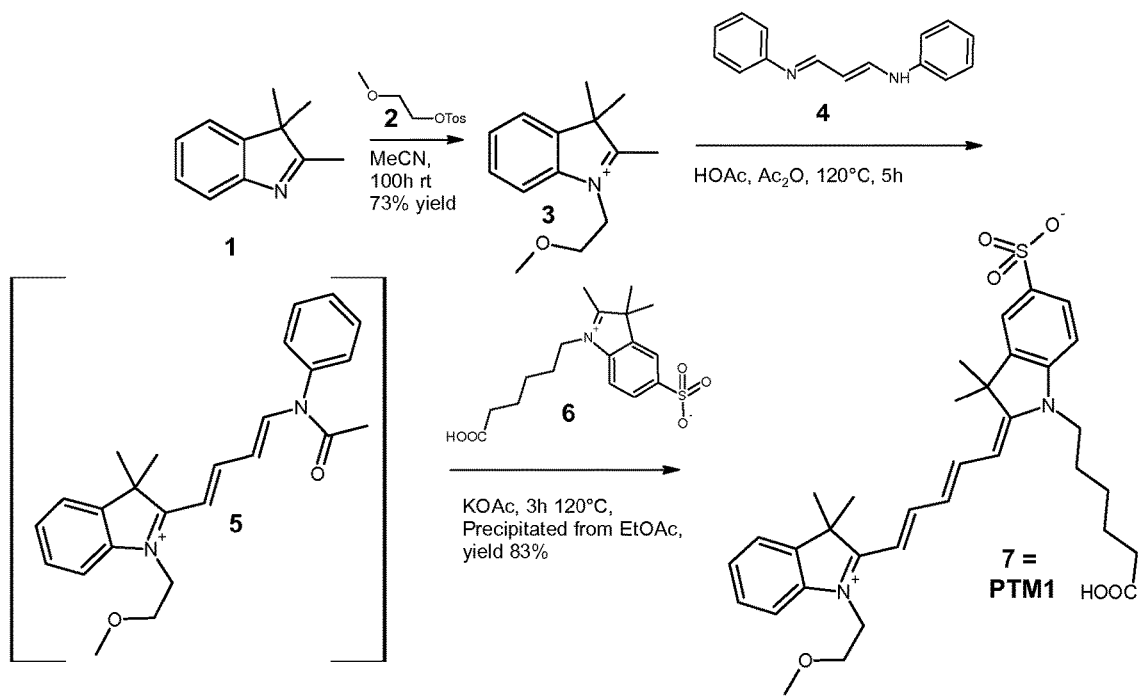

Example 1A and B: Synthesis of a Polymethine Targeting Moiety (PTM), Useful for Hepatocyte Targeting The synthesis scheme is depicted in FIGS. 5A and B The synthesis scheme for PTM1 (7) is outlined in FIG. 5A:

Step 1: 1.6 g (10 mmol) Trimethylindoleine (1) were dissolved in 40 mL of acetonitrile and a solution of 2.53 g (11 mmol) of tosylethyleneglycole methyl ether (2) in 10 mL acetonitrile was added. The reaction mixture was stirred at room temperature 4 days under a bed of argon. 1-(2-methoxyethyl)-2,3,3-trimethyl-3H-indol-1-ium (3) precipitates from the solution and is filtered off, washed with a mixture of acetonitrile and diethyl ether and dried to yield 2.18 g (73%).

Step 2 and 3: Intermediate 5 was obtained as purple solution by heating a mixture of 111 mg (5 mmol) of malonaldehydedianile hydrochloride (4) and 110 mg (5 mmol) 1-(2-methoxyethyl)-2,3,3-trimethyl-3H-indol-1-ium (3) in a mixture of 5 mL of glacial acetic acid and 0.5 mL of acetic anhydride to 120° C. for 2.5 h. The solution was allowed to cool to −70° C. and 177 mg of 1-(5-carboxypentyl)-2,3,3-trimethyl-3H-indol-1-ium-5-sulfonate (6) and 350 mg of KOAc were added. After the addition, the reaction mixture was heated again to 120° C. for 3 h. The reaction was monitored by TLC. The cooled mixture was poured into 50 mL of EtOAc to precipitate crude polymethine dye 7 as dark blue solids. The solids were washed with EtOAc (3×30 mL) and dried in vacuo. (Yield: 83%).

Further purification was accomplished by prep. C18-RP-HPLC with acetonitrile and 0.1% formic acid.

Mass (ES+) m/z for $C_{35}H_{43}O_6N_2S$, $[M+1]^+$, Calculated: 607.2836, Found: 608.2833

Figure 5B:
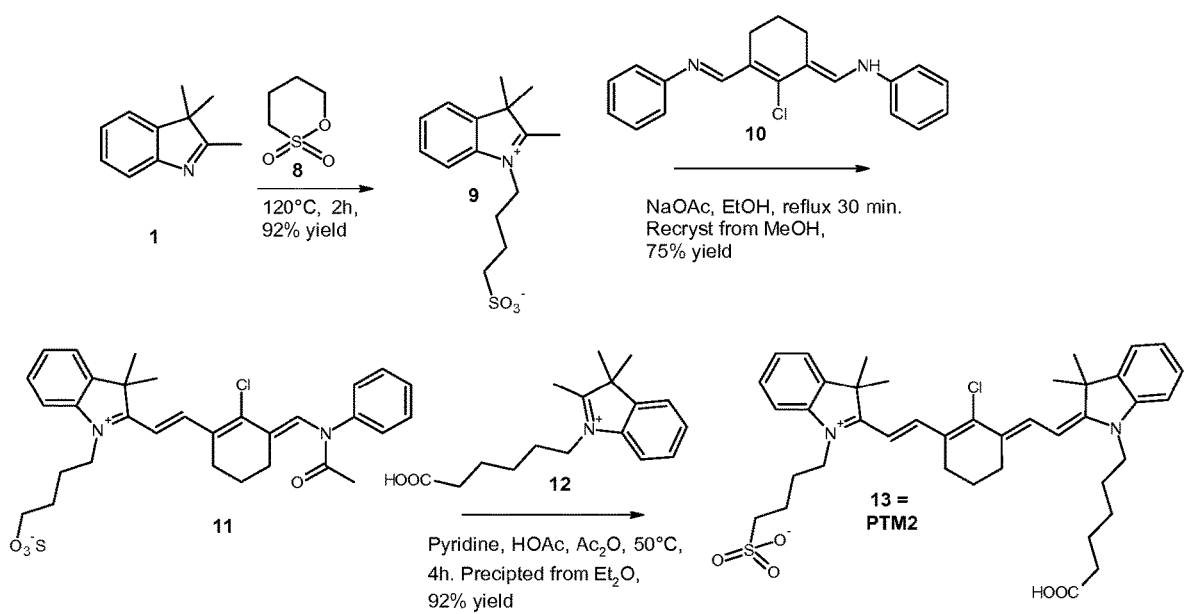

The synthesis scheme for PTM2 (13) is depicted in FIG. 5B.

Step 1: A solution of 3 mmol 2,3,3-trimethyl-3H-indole (1) in 9 mmol of 1,4-butane sultone (2) is heated at 120° C. for 2 h. After cooling, the residue is washed with acetone (3×50 mL), filtered and dried to obtain 9 in 75% yield.

Step 2: A mixture of (9) (0.9 mmol) and 3-chloro-2,4-trimethylenenglutacondianil×HCl (10) (1 mmol) (from Sigma) in 4 mL acetic anhydride and 1 mL glacial acetic acid is heated at 100° C. for 2 h. After cooling, the solution is precipitated carefully in diethyl ether, and the crude product filtered off. For further purification, the crude product is dissolved in 3 mL DCM and precipitated again in diethyl ether. The purple solid is filtered, washed with water and fried to yield 11 with sufficient purity for the next step. Yield: 72%.

Step 3: A solution of 3 mmol of compound 11 and 3.3 mmol of the commercially available 6-(2,3,3-trimethylindol-1-yl)-hexanoic acid bromide (12) (AKos Chemicals) in a mixture of 20 mL pyridine and 2 mL of acetic acid is heated at 50° C. for 4 h. After cooling, (13) is precipitated from diethyl ether, re-dissolved in pyridine and precipitated with diethyl ether. The crude product was dissolved in DCM, washed with 0.1M HCl, and brine and evaporated to dryness.

Further purification was accomplished by prep. C18-RP-HPLC with acetonitrile and 0.1% formic acid.

Mass (ES+) m/z for $C_{40}H_{49}O_5N_2ClS$, $[M+1]^+$, Calculated: 705.3454, Found: 705.3449

Example 2: Interconversion of Functional Groups at the PTM

Step 4: (Also shown in FIG. 6) For the amine functionalization of carboxylic acid dye 7, 1 mmol is dissolved in 10 mL DCM. To the solution, successively 1.2 mmol of HBTU, 1 mmol of Hunig's Base and 1.5 mmol of ethylendiamine (free base) are added and the mixture is stirred for 12 h at rt. The final product is purified by precipitation from diethyl ether, a second precipitation from DMF in diethyl ether and finally, C18 RP column chromatography (acetonitrile/formic acid) to obtain 7a as a dark blue solid in 68% yield.

Step 4a (Also shown in FIG. 6) For the maleimide functionalization of carboxylic acid dye 4, 1 mmol is dissolved in 10 mL DCM. To the solution, successively 1.2 mmol of HBTU, 1.5 mmol of Hünig's Base and 1.5 mmol of aminoethylmaleimide×TFA are added and the mixture is stirred for 12 h at rt. The final product is purified by precipitation from diethyl ether, a second precipitation from DMF in diethyl ether and finally, C18 RP column chromatography (acetonitrile/formic acid) to obtain 13a as a dark green solid in 77% yield.

Example 3: Coupling of PTM1 to PLGA 1 g of PLGA (Resomer RG 502 H) MW: 12.000 is dissolved in 5 mL of $CHCl_3$ and 8 mg EDC×HCl, pre-dissolved in 1 mL of chloroform and 4.8 mg NHS in 1 mL DMF is added. The activation mixture is stirred for 4 h and then 1 mL of a solution (1 mg/mL in DMF) of the amine functionalized dye (7a) and 80 μL of trimethylamine is added under an inert atmosphere. After stirring the mixture at rt for 18 h, 58 μL of glacial acetic acid is added and the solvents removed under a hard vacuum. The resulting sticky oil is washed 5 times with 50 mL of water and 2 times with 50 mL of methanol. To get rid of free dye, the residue is dissolved in 350 mL of acetonitrile and 10 g of freshly washed Amberlite IR120H (5×water wash, then 3× acetonitrile wash) is added. The flask is rotated at the rotary evaporator without any vacuum or heating for 40 min. The solution is filtered off and evaporated under reduced pressure. The residue is dissolved in 6 mL of acetonitrile again and precipitated in 100 mL of cold water (0° C.). The precipitated polymer is filtered off and lyophilized. This dye-labelled PLGA was used for the preparation of the nanoparticles, described in the in vivo experiments according to a standard nanoprecipitation procedure or an emulsion procedure for the encapsulation of an appropriate agent. For a skilled person, the regular process according to standard protocols, can be conducted without problems.

Example 4: Coupling of the PTM to Genetic Material

Direct Coupling of Genetic Material-Based Inhibitors to a Maleimide Functionalized Polymethine Targeting Moiety (EndTag®)

According to Vectorlabs®, 1 μg PKC-siRNA (custom made by JenaBioscience) is incubated with T4 polynucleotide kinase and ATPγS in reaction buffer for 30 min at 37° C. The reaction is purified with a ThermoFischer RNA purification kit and stored carefully, as it is necessary for RNA. (low temperature, sterile and RNAse free!). The activated siRNA is then suspended in 50 µL of PBS buffer and 1 µg of maleimide functionalized PTM (13b) is added and shaken for 30 min at 65° C. The final construct is purified again under sterile conditions with a ThermoFischer RNA purification kit.

Example 5: Preparation of Nanoparticles

After functionalization of the polymer with the polymethine targeting moiety (see Example 3), nanoparticles were produced by nanoprecipitation using polyvinylalcohol (PVA) as surfactant. The PTM1-labelled polymer and the PKC inhibitors BIM-1 and midostaurin or the PI3K inhibitor AS 605240 were dissolved in DMSO and the solution was slowly dropped into a vigorously stirred aqueous 0.3% PVA solution. The formed nanoparticles contain 3 wt % of BIM-1, 6 wt % of midostaurin or 12 wt % of AS 605240 encapsulated in the PTM labelled PLGA. The solution is purified and concentrated by cross-flow filtration (Sartorius). Methods for the preparation of inventive nanoparticles by emulsion, double emulsion and nanoprecipitation is further exemplary illustrated in FIG. 9.

The evaluation and visualization of the hepatocyte targeting is performed according to the intravitalmicroscopic methods of WO2015/035974, the disclosure of which is herewith fully referred to and incorporated.

Example 6: Characterization of Inventive Nanoparticles

Nanoparticles of PTM1-PLGA (Example 3) were produced with constant parameters and reproduced according to the protocol as follows:

Size: Measurement of the size of the various nanostructured delivery systems dissolved in deionized water by dynamic light scatter (for example, Zetasizer (Malvern Instruments GmbH)) or by electron micrographs.

Shape: Determination of shape by electron micrographs.

Charge: Measurement of the various nanostructured delivery systems dissolved in deionized water using a Zetasizer (Malvern Instruments GmbH) by determining the electrophoretic signal (zeta potential, surface charge).

Endotoxins: Endotoxin content was determined with a Charles River test kit basing on the LAL chromogenic assay according to D. E. Guilfoyle, et al., *Evaluation of a chromogenic procedure for use with the Limulus lysate assay of bacterial endotoxins drug products*, J Parenter Sci Technol, 1985, 39(6): pp. 233-6.

Hemolysis: Measurement of the hemoglobin concentration of erythrocytes which were incubated with the particles in physiological buffer for one hour. The measurable hemoglobin concentration in the supernatant increases when there is damage to the erythrocyte membrane.

Aggregation: Measurement of the absorption of erythrocytes incubated with the polymers in physiological buffer. Samples with cell aggregates show a lower absorption than homogeneously distributed non-aggregated cells.

TABLE 1

| | Results | | | |
|---|---|---|---|---|
| | A | B | C | D |
| Size [nm] | 107 | 64 | 166 | 101 |
| PDI | 0.18 | 0.16 | 0.20 | 0.22 |
| Zeta potential | −12 | −7 | −15 | −25 |

A: Untargeted nanoparticles (PLGA/PVA) with 2.5% encapsulated Neutral-lipid orange
B: PTM1-targeted nanoparticles from example 5 with 4% BIM-1 (PKC inhibitor)
C: PTM1-targeted nanoparticles from example 5 with 12% AS605230 (PI3 kinase inhibitor)
D: PTM1-targeted nanoparticles from example 5 with 6% midostaurin (PKC inhibitor)

Example 7: Static Macrophage Assay and Dynamic Chip Based Microfluidic Model for Hepatocyte Targeting and Interaction with Macrophages The Macrophage assay was used to investigate if any unwanted uptake and/or effect of nanoparticles by macrophages occur. Interactions between NPs and macrophages can seriously reduce the efficacy of NPs. In addition, interaction can result in activation of macrophages, thereby harming the surrounded tissue, after all the host. Therefore, the interaction between NPs and macrophages should be proven first. Particle size, shape and coating and surface charge are critical determinants. Two assays were performed under static conditions:

A. Human Peripheral Blood Mononuclear Cell (PBMC) Culture and Macrophage Differentiation PBMCs were freshly isolated immediately after collecting donor blood from healthy volunteers. The donors were informed about the aim of the study and gave written informed consent. Blood sample volume was diluted in a ratio 1:1 with PBS without calcium and magnesium (Biochrom AG, Germany) containing 0.1% bovine serum albumin (BSA, Carl Roth, Germany) and 2 mM EDTA (Sigma-Aldrich, Germany; isolation buffer) and carefully laid on top of Biocoll separating solution (Biochrom AG, Germany). PBMCs were obtained from density gradient centrifugation. The cells were washed subsequently in isolation buffer for several times and were finally strained by a 40 µm molecular mesh (BD Bioscience, Germany). For monocyte enrichment $10^7$ PBMCs per well (9.6 cm$^2$) were plated on a six well plate (or in smaller wells with comparable cell density) in 2 mL X-VIVO 15 (Lonza, Germany) supplemented with 10% autologous serum, 10 ng/mL GM-CSF (PeproTech, Germany), 100 units/mL penicillin, and 100 µg/mL streptomycin (Life Technologies, Germany). The cells were washed with plain X-VIVO 15 medium after 3 h of incubation and fresh medium with supplements (stated above) was added. Including the preparation time for nanoparticle experiments, macrophage (Mφ) differentiation was performed for five days.

A1. Murine Macrophage Cell Line RAW264.7 Culture and Differentiation

RAW 264.7 macrophages (CLS, Eppelheim, Germany) were cultivated in 75 cm$^2$ cell culture flasks in RPMI 1640 medium supplemented with 2 mM L-glutamine, 10% fetal bovine serum and 100 units/mL penicillin, and 100 µg/mL streptomycin at 37° C. in humidified 5% $CO_2$/95% air atmosphere. Media exchange was performed after 2-4 days (depending on cell confluency). For experiments macrophages were detached by Accutase treatment and were seeded, cultured for 24 hours and then incubated with particles (i.e. NPs with loaded neutral lipid orange in phenol-red free medium for individual time periods. After incubation macrophages were harvested and/or lysed followed by individual analysis (i.e. by a microplate reader with fluorescence detection system). Protein contents were analyzed using BCA Assay (Thermo Fisher Scientific, USA)

To achieve more meaningful data compared to static mono-cell culture, several scalable co-culture-models were used. They resemble the in vivo situation better than static mono-cell cultures:

A2. Co-Culture of Endothelial Cells and Macrophages

According to Rinkenauer A C et al., *Comparison of the uptake of methacrylate-based nanoparticles in static and dynamic in vitro systems as well as in vivo*, J Control Release. 2015; 216:158-68, Nanoparticles (NP) were tested in co-culture model of endothelial cells and macrophages under physiologic shear stress conditions. Briefly, monocytes were harvested 24 h after isolation by treatment with 4 mg mL$^{-1}$ lidocaine (Sigma-Aldrich, Germany) and 5 mM EDTA. Confluent HUVECs were detached using trypsin. Monocytes were stained with 1 μM CellTracker green CMFDA (Life Technologies, Karlsruhe, Germany) for 45 min in serum-free X-VIVO 15. Subsequently, monocytes and HUVECs were pooled 1:3 in Endothelial Growth Medium MV supplemented with 10% autologous serum, 10 ng mL$^{-1}$ GM-CSF and 100 UmL$^{-1}$ penicillin and 100 μgmL$^{-1}$ streptomycin and seeded at a density of $1.3 \times 10^5$ HUVECs cm-2 and $0.43 \times 10^5$ monocytes cm$^2$ into rhombic chamber chips. Medium was changed on a daily basis. Mφ differentiation was performed in presence of GM-CSF for 72 h under static culture conditions. HUVEC were perfused using peristaltic pumps (Ismatec REGLO digital MS-CA-4/12-100, Germany). Shear stress within rhombic chamber chips was calculated as previously described (Raasch et al., *Microfluidically supported biochip design for culture of endothelial cell layers with improved perfusion conditions*, Biofabrication, 2015, 7(1):015013). Shear stress of 0.7, 3.0, 6.0 and 10.0 dyn cm$^{-2}$ was applied for 24 h following 60 min nanoparticle uptake at a concentration of 200 μg mL$^{-1}$. Negative charged nanoparticles containing nile red were solved in Endothelial Cell Growth Medium MV without additives B. Dynamic42 Sinusoid—Chip Based Microfluidic Model Cell specificity and targeting is determined in a chip based microfluidically supported multi-cell culture system consisting of macrophages, hepatocytes, stellate cell and, endothelial cells. According to Rennert K. et al, *A microfluidically perfused three-dimensional human liver model*, Biomaterials 2015; 71:119-131, the cell culture and assembling of the Dynamic42 Sinusoid-model was performed:

HepaRG and Endothelial Cell Preparation for Dynamic42 Sinusoid Model

HepaRG cells were seeded at a density of $2.7 \times 10^4$ cells/cm$^2$ and cultured in William's Medium E (Biochrom, Berlin, Germany) containing 10% (v/v) FCS (Life Technologies, Darmstadt, Germany), 5 μg/ml insulin (Sigma Aldrich, Steinheim, Germany), 2 mM glutamine (GIBCO, Darmstadt, Germany), 50 μM hydrocortisone-hemisuccinate (Sigma-Aldrich) and 100 U/ml Penicillin/100 mg/ml Streptomycin mixture (Pen/Strep) (GIBCO). The cells were cultured in a humidified cell incubator at 5% $CO_2$ and 37° C. for 14 days before differentiation. Medium was renewed every 3-4 days. Cell differentiation was induced and cells were used up to 4 weeks.

Endothelial cells: Human umbilical cord vein endothelial cells (HUVECs) were isolated from human umbilical cord veins. Donors were informed about the aim of the study and gave written consent. HUVEC cells were seeded at a density of 2.5 10$^4$ cells/cm$^2$ and cultured in Endothelial Cell Medium (ECM) (Promocell, Heidelberg, Germany) up to passage 4.

Lx-2 Stellate Cell and Macrophage Preparation for Dynamic42 Sinusoid Model

LX-2 stellate cells (kindly provided by Scott L. Friedman, Division of Liver Diseases, Mount Sinai School of Medicine, New York City, NY, USA) were seeded at a density of $2.0 \times 10^4$ cells/cm$^2$ and cultured in Dulbecco's Minimum Essential Medium (DMEM) (Biochrom) supplemented with 10% (v/v) FCS, 1 mM sodium pyruvate (GIBCO) and Pen/Strep. Peripheral Blood Mononuclear Cells (PBMCs) were isolated by Ficoll density gradient centrifugation and seeded at a density of $1.0 \times 10^6$ cells/cm$^2$ in X-VIVO 15 medium (Lonza, Cologne, Germany) supplemented with 10% (v/v) autologous human serum, 10 ng/ml human granulocyte macrophage colony-stimulating factor (GM-CSF) (PeproTech, Hamburg, Germany) and Pen/Strep. After 3 h incubation in a humidified cell incubator at 5% $CO_2$ and 37° C. the cells were washed twice with X-VIVO 15 medium. Adherent monocytes were cultivated for 24 h in X-VIVO 15 medium and seeded into the liver sinusoid.

Assembly of the Dynamic42 Sinusoid

Liver sinusoid models were assembled by staggered seeding of vascular and hepatic cell layers. In each sterilized biochip $2.7 \times 10^5$ HUVEC's/cm$^2$ (in total 3.0 10$^5$ cells) and $0.9 \times 10^5$/cm$^2$ Monocytes (in total $1 \times 10^5$ cells) were mixed and seeded on top of the membrane in the upper chamber. HUVEC/monocytes were co-cultured for at least 3 days with a daily medium exchange in endothelial cell culture medium (ECM) supplemented with 10 ng/ml epidermal growth factor, 90 mg/ml heparin, 2.8 mM hydrocortisone, endothelial cell growth supplement, 10 ng/ml GM-CSF, 10 ng/ml M-CSF to induce macrophage differentiation, 100 U/ml penicillin/100 mg/ml streptomycin and 10% (v/v) autologous human serum (Life Technologies, Karlsruhe, Germany). Subsequently, $2.7 \times 10^5$/cm$^2$ differentiated HepaRG (in total $3 \times 10^5$ cells) and $0.9 \times 10^4$/cm$^2$ LX-2 (in total $1 \times 10^4$ cells) were seeded on the membrane at the opposite side of HUVEC cells and cultured for 24 h in DMSO-free William's Medium E (Biochrom, Berlin, Germany) hepatocyte growth medium containing 50 μM hydrocortisone, 10% (v/v) FBS containing, 5 μg/ml insulin, 2 mM glutamine and 100 U/ml penicillin/100 mg/ml streptomycin prior to experimental use.

TABLE 2

Dimensions of the sinusoid chip

| | length/width/height (mm) |
|---|---|
| chip body | 75.5/22.5/1.5 |
| upper channel | 15.0/2/0.45 |
| lower channel | 16.8/2/0.40 |
| membrane (8 μm pore diameter) | 13/8.5/0.02 |

| | distance (mm) |
|---|---|
| membrane to upper sealing foil | 0.7 |
| membrane to lower sealing foil | 0.8 |

TABLE 3

| Flow rates within the sinusoid chip | | |
|---|---|---|
| | flow rate (μl/min) | shear stress ((dyn * s)/cm$^2$) |
| upper channel | 50 | 0.7 |
| lower channel (as indicated in corresponding experiments) | 1 | 0.01 |
| | 3 | 0.03 |
| | 10 | 0.12 |

Liver sinusoid models were equilibrated after 7 days in static culture by perfusion with a flow rate 50 μl/min for up to 72 hours. Subsequently, drug constructs and controls (at least triplicates) were incubated for individual time periods in the liver sinusoid model under variable dynamic conditions. Afterwards liver sinusoids were fixed by paraformaldehyde or methanol or both and analyzed by immunofluorescence staining. The different cell layers were examined with a fluorescence microscope to analyze the enrichment of the constructs in or on different cell types. In addition, it is possible to lyse the vascular and hepatic cell layer separately and to measure the cell-specific taken up nanoparticles by a microplate reader with fluorescence detection system.

Example 8: Determination of the Cytotoxicity

Figure 10:
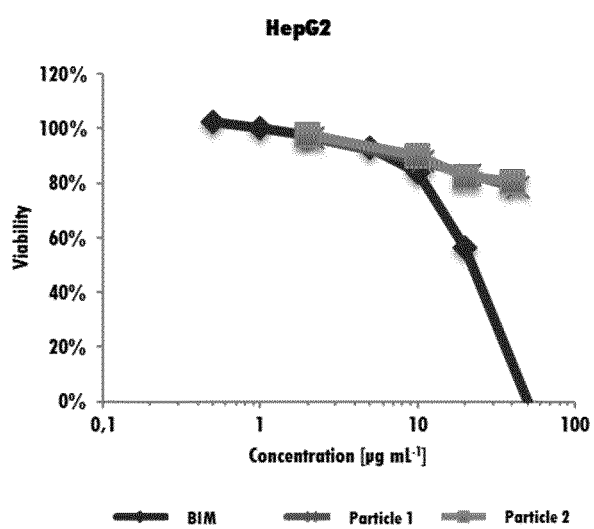
FIG. 10 shows toxicity of targeted nanoparticles vs free drug (BIM-1) in HepG2 cells.

Cytotoxicity studies were performed with HepG2 (human liver cancer cell line), as recommended by ISO10993-5. Cells were seeded at 104 cells per well in a 96-well plate in Dulbecco's modified eagle's medium (DMEM, Lonza, Basel) supplemented with 10% fetal calf serum (FCS), 100 U/mL penicillin and 100 mg/mL streptomycin and incubated for 24 h at 37 C.° in a humidified 5% (v/v) $CO_2$ atmosphere. The testing substances (polymers) at indicated concentrations (from 0.5 μg/mL to 50 μg/mL) were added to the cells and the plates were incubated for further 24 h. Control cells were incubated with fresh culture medium. Subsequently, the medium was replaced by a mixture of fresh culture medium and Alamar-Blue solution (Life technologies, Darmstadt, Germany), prepared according to the manufacturer's instructions. After a further incubation of 4 h at 37° C., the fluorescence was measured at Ex 570/Em 610 nm, with untreated cells on the same well plate serving as negative controls. The negative control was standardized as 0% of metabolism inhibition and referred as 100% viability. Cell viability below 70% was considered indicative of cytotoxicity. Data are expressed as mean±S.D. of three determinations. FIG. 10 shows that the encapsulated drug is less toxic in higher concentrations compared to the free drug (BIM-1).

Example 9: Survival-Rate in Cholestasis Model Under Septic Conditions "Peritoneal Contamination and Infection (PCI)"

Experimental Setup

A systemic infection/sepsis with organ failure was induced in male C57/BL6 mice by using the PCI model. For this purpose, a human fecal suspension (2.5 μl/g BW for stool batch1 and 6 μl/g for stool batch 2, respectively) was injected intraperitoneally (without anesthesia) with weight adaptation, thus triggering peritonitis with subsequent systemic infection. In order to avoid the burden on the animals and a dying, 6 hours after infection twice a day, the broad-spectrum antibiotic Meropenem is administered subcutaneously (2.5 μg/g body weight). The animals were closely monitored and scored every 6 hours for signs of infection in order to timely. With stool batch 1, a dose of 2.5 μg/g produced a 70% of the mice died within the first two days and the remaining 30% died until day 7 (FIG. 11, left panel). With the evaluated dose of 6 μl/g BW stool and additional antibiotic therapy, all mice died within three days, as shown in the Kaplan-Meier-Schatzer diagram (FIG. 11, right panel). Experimental data partly rely on experiments with batch 1 and partly with batch 2. Details are stated in the FIG. 11.

For dose determination, three drug concentrations per formulation were tested in small groups and changes in survival are documented. The free drugs were used for dose evaluation (data not shown) and ⅛ of the effective dose was used in the targeted nanoparticles. The PI3K inhibitor AS605240 and the PKC inhibitors BIM-1 alone were active at 4 mg/kg body weight. In the nanoparticle, we used 0.5 mg/kg and obtained in all cases an even more pronounced effect. For midostaurin, 6 mg/kg of the free drug and 0.75 mg/kg were used in the nanoparticle formulation.

Six hours after infection (PCI model), the therapy is carried out with different drug, capable to reduce the activity of PKC (BIM-1 and midostaurin as PKC inhibitors and AS605240 as PI3 kinase inhibitor) or control formulations (once daily, i.p. or i.v.) and also the combined volume and antibiotic therapy (twice daily, s.c.). The therapy with the drug is scheduled for 5 days. The volume/antibiotic therapy takes place over 7 days (2 days longer than the drug therapy). The observation in the first 5 days is performed in a 3-hour interval for 24 hours a day. This is followed by observation of the animals until day 14 (twice a day).

9a) PTM1 Targeted PLGA-Nanoparticles with BIM-1 as Archetypical PKC Inhibitor as Cargo We prepared nanoparticles as described in example 5 with the synthesized PTM1-PLGA, PVA as surfactant and BIM-1 with the following concentrations/loading efficiency.

PTM-PLGA: 66%
PVA: 31%
BIM-1: 4%
Size/zeta potential: 93 nm/−18

The particle suspension was diluted with a 45% glucose solution to a final glucose concentration of 5%.

Ten mice were treated with the targeted nanoparticles and to test the tolerability of the nanoparticles in healthy mice was evaluated with two sham mice. The results are illustrated in FIG. 12 and demonstrate within 7 days an increased survival from 10% to 80%.

9b) PTM Targeted PLGA-Nanoparticles with AS605240 as Experimental Pi3K Inhibitor as Cargo The particles were prepared analogously to example 5 with slightly modified parameters: We prepared nanoparticles as described above with the synthesized PTM-PLGA, PVA as surfactant and AS605240 with the following concentrations/loading efficiency.

PTM-PLGA: 58%
PVA: 30%
AS605240: 12%
Size/zeta potential: 166 nm/−15

The particle suspension was diluted with a 45% glucose solution to a final glucose concentration of 5%.

Six mice were treated with the targeted nanoparticles and to test the tolerability of the nanoparticles in healthy mice was evaluated with two sham mice. The results are illustrated in FIG. 13 and demonstrate within 7 days an increased survival from 0% to 40%.

9c) PTM1-Targeted PLGA-Nanoparticles with Midostaurin as Approved Kinase Inhibitor with Marked PKC Inhibition as Cargo:

The particles were prepared analogously to example 5 with slightly modified parameters: We prepared nanoparticles as described above with the synthesized PTM-PLGA, PVA as surfactant and midostaurin with the following concentrations/loading efficiency.

PTM-PLGA: 69%
PVA: 25%
midostaurin: 6%
Size/zeta potential: 101 nm/−25

The particle suspension was diluted with a 45% glucose solution to a final glucose concentration of 5%.

Five mice were treated with the targeted nanoparticles and to test the tolerability of the nanoparticles in healthy mice was evaluated with two sham mice.

The results are illustrated in FIG. 14 and demonstrate within 7 days an increased survival from 10% to 60%.

The invention claimed is:

1. A nanostructured delivery system, comprising:
   an inhibitor of a protein kinase C (PKC) signaling pathway; at least one polymethine dye, the polymethine dye including two indole moieties; and a carrier,
   wherein the inhibitor of the protein kinase C (PKC) signaling pathway is a PKC inhibitor selected from the group of staurosporine, midostaurin, UCN-01, sotrastaurin, enzastaurin, ruboxistaurine, tivantinib, enzastaurin, Go 6983, K252a, ANA-12, lestaurtinib, stauprimide, CEP-701, Arcyriaflavin A, chelerythrine chloride, and Bisindolylmaleimids II-XII,
   and the nanostructured delivery system is adapted for treating a septic cholestasis by lowering or inhibiting PKC in liver cells.

2. The nanostructured delivery system of claim 1, wherein the polymethine dye is covalently attached to the carrier.

3. The nanostructured delivery system of claim 2, wherein the inhibitor is encapsulated by the carrier.

4. The nanostructured delivery system of claim 1, wherein the inhibitor is covalently attached to the polymethine dye or to the carrier.

5. The nanostructured delivery system of claim 1, wherein the polymethine dye has a structure I or a structure II,

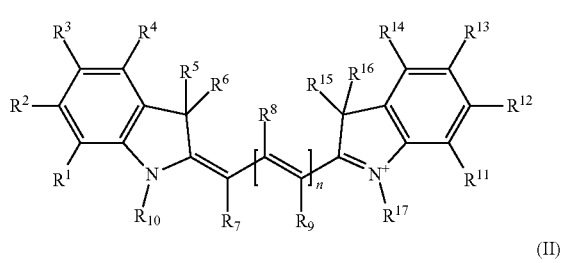

(I)

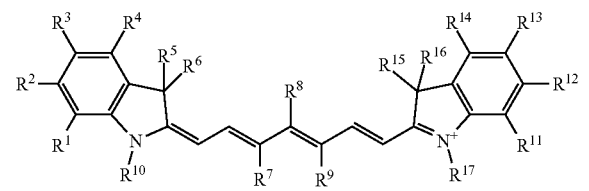

(II)

wherein
(i) n is an integer from 0 to 10;
(ii) R1-R17 are the same or different and independently selected from hydrogen, or deuterium, or halogen, or alkyl, or tert-alkyl, or cycloalkyl, or aryl, or carboxyaryl, or dicarboxyaryl, or heteroaryl, or a heterocycloaliphatic radical, or alkyloxy, or arlyoxy, or heteroaryloxy, or two ortho-positioned substituents of R1-R17 form together a ring structure, the ring structure being an aromatic ring, a heteroaromatic ring, an aliphatic ring, or a heteroaliphatic ring, or R7 and R9 form together a ring structure;
(iii) at least one of the R1-R17 includes an ionic or ionizable group; and
(iv) at least one of R1-R17 includes a reactive functional group.

6. The nanostructured delivery system of claim 5, wherein the ionic or ionizable group is selected from $-SO_3^-$, $-PO_3H^-$, $-PO_3^{2-}$, or $-NR_3^+$.

7. The nanostructured delivery system of claim 5, wherein the reactive functional group is selected from carboxyl, thiol, amine, maleimide, vinyl, hydroxyl, isocyanate, nitrate, cyano, halide, or azide.

8. The nanostructured delivery system of claim 5, wherein the reactive functional group is connected to the polymethine dye by a spacer group.

9. The nanostructured delivery system of claim 5, wherein the inhibitor of the PKC signaling pathway is covalently attached to the polymethine dye via the reactive functional group.

10. The nanostructured delivery system of claim 5, wherein the polymethine dye includes structure (II), with R8 being chlorine.

11. The nanostructured delivery system of claim 1, wherein the at least one polymethine dye is an indocyanine (ICG) derivative.

12. The nanostructured delivery system of claim 1, wherein the at least one polymethine dye is adapted to trigger an uptake of the nanostructured delivery system into parenchymal cells of the liver comprising a tissue-specific transporter.

13. The nanostructured delivery system of claim 12, wherein the tissue-specific transporter is selected from the group consisting of OATP1B1, OATP-C, OATP2, LST-1, OATP1B3, OATP8, OATP2B1, OATP1A2, NaDC3, SDCT2, NTCP, OCT1, OCT3, OAT2, OAT1, OAT3, PGT, OCT2, OAT1, OATP4A1, and OATP4C1.

14. The nanostructured delivery system of claim 1, wherein the carrier includes at least one polymer, or at least one lipid, or at least one virus-like particle, or any combination thereof.

15. The nanostructured delivery system of claim 14, wherein the carrier includes at least one polymer, the at least one polymer being selected from the group of a polyester, a polyacrylate, a polystyrene derivative, a polyamide, a polyurethane, a polyacrylonitrile, a polytetrafluoroethylene, a silicone, a polyethylene glycol, a polyethylene oxide, a polyoxazoline, a polysaccharide, or any combination thereof or any copolymer thereof.

16. The nanostructured delivery system of claim 15, wherein the at least one polymer includes PLGA, PLA, PCL, PGA, PDMAEMA, PMMA, PMAA, PEI, PEtOx, PEG, HPMA, APMA, PVP, hydrolyzed PVP, or any combination thereof.

17. The nanostructured delivery system of claim 16, wherein the polymer includes PLGA and the inhibitor of the PKC signaling pathway is midostaurin.

18. The nanostructured delivery system of claim 14, wherein the carrier includes at least one lipid, the at least one lipid being selected from the group of a saturated fatty acid, an unsaturated fatty acids, a cholesterol derivative, a phospholipide, a sphingolipide, a lipoprotein, a glycolipide, or any combination thereof.

19. The nanostructured delivery system of claim 14, wherein the carrier includes at least one virus-like particle, the at least one virus-like particle is derived from a virus selected from the group of Bacteriophage MS2, Bacteriophage QB, Enterobacteria phage P22, Cowpea mosaic virus (CPMV) Cowpea Chlorotic Mottle Virus (CCMV), hepatitis B virus carrier (HBVc), or Adeno associated virus (AAV).

20. The nanostructured delivery system of claim 1, wherein an amount of the inhibitor of the PKC signaling pathway is not greater than 12 wt % based on a total weight of the nanostructured delivery system.

21. The nanostructure delivery system of claim 1, wherein the nanostructured delivery system is a nanoparticle having a size in a range of 64 nm and 166 nm.

22. A method of treating septic cholestasis comprising:
    preparing a nanostructured delivery system, the nanostructured delivery system comprising a PKC inhibitor selected from the group of staurosporine, midostaurin, UCN-01, sotrastaurin, enzastaurin, ruboxistaurine, tivantinib, enzastaurin, Go 6983, K252a, ANA-12, lestaurtinib, stauprimide, CEP-701, Arcyriaflavin A, chelerythrine chloride, and Bisindolylmaleimids II-XII;
    at least one polymethine dye, the polymethine dye including two indole moieties; and a carrier;
    dissolving the nanostructured delivery system in a solvent; and
    administering a pharmaceutically effective amount of the nanostructured delivery system to a patient diagnosed with a septic cholestasis,
    wherein the nanostructured delivery system is adapted for treating the septic cholestasis by lowering or inhibiting PKC in liver cells.

23. The method of claim 22, wherein the polymethine dye has a structure I or a structure II,

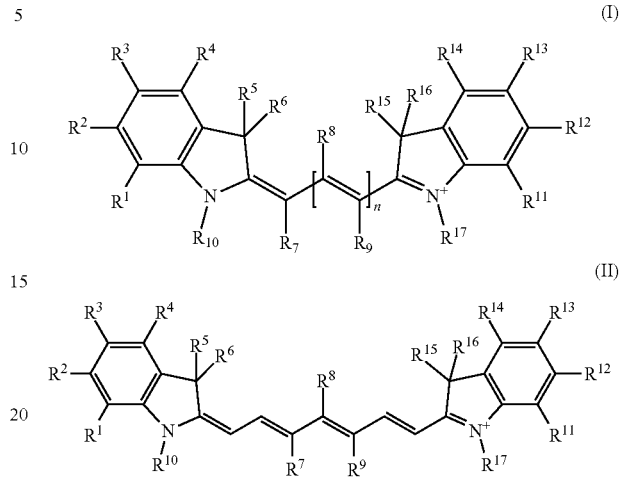

wherein
(i) n is an integer from 0 to 10;
(ii) R1-R17 are the same or different and independently selected from hydrogen, or deuterium, or halogen, or alkyl, or tert-alkyl, or cycloalkyl, or aryl, or carboxyaryl, or dicarboxyaryl, or heteroaryl, or a heterocycloaliphatic radical, or alkyloxy, or arlyoxy, or heteroaryloxy, or two ortho-positioned substituents of R1-R17 form together a ring structure, the ring structure being an aromatic ring, a heteroaromatic ring, an aliphatic ring, or a heteroaliphatic ring, or R7 and R9 form together a ring structure;
(iii) at least one of the R1-R17 includes an ionic or ionizable group; and
(iv) at least one of R1-R17 includes a reactive functional group.

* * * * *